United States Patent [19]
Barrett

[11] Patent Number: 5,467,413
[45] Date of Patent: Nov. 14, 1995

[54] METHOD AND APPARATUS FOR VECTOR QUANTIZATION FOR REAL-TIME PLAYBACK ON LOW COST PERSONAL COMPUTERS

[75] Inventor: Peter T. Barrett, Palo Alto, Calif.

[73] Assignee: Radius Inc., Sunnyvale, Calif.

[21] Appl. No.: 64,843

[22] Filed: May 20, 1993

[51] Int. Cl.$^6$ ..................................................... G06K 9/36
[52] U.S. Cl. ........................... 382/236; 382/239; 382/253; 348/405; 348/422
[58] Field of Search .................... 382/56, 236, 239, 382/253; 358/432, 433; 348/399, 403, 404, 405, 420, 422, 438; H04N 1/41, 7/12, 11/02

[56] References Cited

U.S. PATENT DOCUMENTS

| | | | |
|---|---|---|---|
| 4,704,628 | 11/1987 | Chen et al. | 358/136 |
| 4,710,812 | 12/1987 | Murakami et al. | 358/136 |
| 4,745,473 | 5/1988 | Hall | 358/133 |
| 4,772,946 | 9/1988 | Hammer | 358/133 |
| 4,821,119 | 4/1989 | Gharavi | 358/136 |
| 4,829,376 | 5/1989 | Hammer | 358/133 |
| 4,868,653 | 9/1989 | Golin et al. | 358/133 |
| 4,897,717 | 1/1990 | Hamilton et al. | 358/133 |
| 4,903,317 | 2/1990 | Nishihara et al. | 382/56 |
| 4,922,508 | 5/1990 | Moriya | 375/34 |
| 4,951,139 | 8/1990 | Hamilton et al. | 358/135 |
| 4,979,039 | 12/1990 | Kisor et al. | 358/133 |
| 5,008,747 | 4/1991 | Carr et al. | 358/136 |
| 5,010,401 | 4/1991 | Murakami et al. | 358/136 |
| 5,050,230 | 9/1991 | Jones et al. | 382/56 |
| 5,065,446 | 11/1991 | Suzuki et al. | 382/56 |
| 5,067,152 | 11/1991 | Kisor et al. | 358/133 |
| 5,068,723 | 11/1991 | Dixit et al. | 358/133 |
| 5,081,450 | 1/1992 | Lucas et al. | 340/728 |
| 5,086,439 | 2/1992 | Asai et al. | 375/122 |
| 5,122,873 | 6/1992 | Golin | 358/133 |
| 5,136,374 | 8/1992 | Jayant et al. | 358/133 |
| 5,136,663 | 8/1992 | Nishio | 382/56 |
| 5,150,209 | 9/1992 | Baker et al. | 358/133 |
| 5,177,797 | 1/1993 | Takenaka et al. | 382/56 |
| 5,194,950 | 3/1993 | Murakami et al. | 358/133 |
| 5,323,187 | 6/1994 | Park | 348/405 |
| 5,341,441 | 8/1994 | Maeda et al. | 382/56 |

OTHER PUBLICATIONS

Gray "Vector Quantization," IEEE ASSP vol. 1, pp. 4–29 (Apr. 1984).

*Primary Examiner*—Leo H. Boudreau
*Assistant Examiner*—Andrew W. Johns
*Attorney, Agent, or Firm*—Limbach & Limbach

[57] ABSTRACT

A vector quantization method and apparatus which processes signal vectors constructed from digital image data (such as a digital video stream). The digital video stream is treated as a sequence of images, each represented by a rectangular array of pixels. The pixels are processed in blocks (typically 4×4 blocks) of two types, known as smooth blocks and detail blocks. The detail blocks contain the original image pixels, while the smooth blocks contain pixels from a subsampled version of the image. The pixels in the blocks are formatted into image vectors, again in two types. Each type of image vector is separately compressed using a vector quantization coder and a separate code book for each type. Smooth image vectors are compressed using a smooth code book and detail image vectors compressed using a detail code book. The compressed data stream is specially constructed, as a stream of code words for smooth and detail image vectors, updates to the code books, and mask bits that select the type of each code word, to facilitate real time decompression on low cost microprocessors. The coding operation can include interframe coding in which the mask bits are additionally coded so that, in addition to selecting the type of each code word, they also indicate that a block does not change from the last frame and the corresponding code word has been omitted. The inventive compression technique results in a high quality video playback with a high compression ratio (typically about one bit per pixel). This allows high quality compressed video to be played back from conventional CD-ROMs or hard disks, and to be transmitted over communications channels with data rates of 1.5 Mbit/sec.

3 Claims, 17 Drawing Sheets

CVC SMOOTH AND DETAIL IMAGES

SMOOTH AND DETAIL BLOCKS IN AN IMAGE

SMOOTH AND DETAIL BLOCK YUV VALUES

DATA STREAM FORMAT FOR KEY FRAME

DATA STREAM FORMAT FOR INTER-FRAME

| FRAME | LENGTH |
|---|---|
| WIDTH | HEIGHT |
| TILE COUNT | |

| TILE | LENGTH |
|---|---|
| TILE TOP | TILE LEFT |
| TILE BOTTOM | TILE RIGHT |

| DETAIL CODE BOOK | LENGTH |
|---|---|
| DETAIL CODE BOOK ENTRIES | |
| SMOOTH CODE BOOK | LENGTH |
| SMOOTH CODE BOOK ENTRIES | |
| CODE | LENGTH |
| VQ IMAGE CODE WORDS | |

OVERALL STRUCTURE OF COMPRESSED FRAME

FIG. 6

| FULL CODE BOOK | LENGTH | |
|---|---|---|
| Y Y Y Y U V | | 0 |
| Y Y Y Y U V | | 1 |
| ⋮ | | |
| Y Y Y Y U V | | N |

CODE BOOK ENTRIES

ORGANIZATION OF FULL CODE BOOK ATOM

FIG. 7

| PARTIAL CODE BOOK | LENGTH = 16 | |
|---|---|---|
| MASK = 0 x 80000400 | | |
| Y Y Y Y U V | | 0 |
| Y Y Y Y U V | | 21 |
| MASK = 0 x 00C00A00 | | |
| Y Y Y Y U V | | 40 |
| Y Y Y Y U V | | 41 |
| Y Y Y Y U V | | 52 |
| Y Y Y Y U V | | 54 |
| MASK = 0 x 00000000 | | |
| MASK = 0 x 00000001 | | |
| Y Y Y Y U V | | 127 |
| PAD WORD | | |

EXAMPLE OF PARTIAL CODE BOOK

FIG. 8

| KEY FRAME CODE | LENGTH |
|---|---|
| SMOOTH/DETAIL MASK ||
| SMOOTH/DETAIL CODES ||
| SMOOTH/DETAIL MASK ||
| SMOOTH/DETAIL CODES ||

•
•
•

OVERALL FORMAT OF KEY FRAME CODE ATOM

FIG. 9

SUMMARY OF ATOM TYPE CODES

| ATOM TYPE CODES ||
|---|---|
| KEY FRAME | 0 x 00 |
| INTER FRAME | 0 x 01 |
| KEY TILE | 0 x 10 |
| INTER TILE | 0 x 11 |
| FULL DETAIL CODE BOOK | 0 x 20 |
| PARTIAL DETAIL CODE BOOK | 0 x 21 |
| FULL SMOOTH CODE BOOK | 0 x 22 |
| PARTIAL SMOOTH CODE BOOK | 0 x 23 |
| KEY FRAME CODES | 0 x 30 |
| INTER FRAME CODES | 0 x 31 |
| ALL SMOOTH CODES | 0 x 32 |

FIG. 12

| MASK = 0 x F0000C00 |
|---|
| DETAIL DETAIL DETAIL DETAIL |
| DETAIL DETAIL DETAIL DETAIL |
| DETAIL DETAIL DETAIL DETAIL |
| DETAIL DETAIL DETAIL DETAIL |
| SMTH SMTH SMTH SMTH |
| SMTH SMTH SMTH SMTH |
| SMTH SMTH SMTH SMTH |
| SMTH SMTH SMTH SMTH |
| DETAIL DETAIL DETAIL DETAIL |
| DETAIL DETAIL DETAIL DETAIL |
| SMTH SMTH SMTH SMTH |
| SMTH SMTH SMTH SMTH |
| SMTH SMTH |

DETAIL = 8 BIT DETAIL BLOCK CODE
SMTH = 8 BIT SMOOTH BLOCK CODE

EXAMPLE OF MASK BITS AND KEY FRAME CODE FRAGMENT

FIG. 10

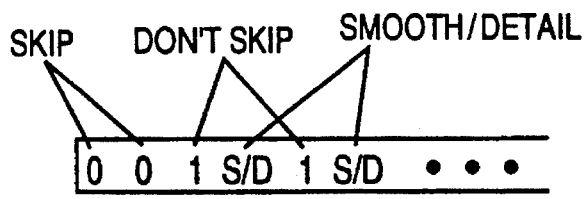

0 = SKIP BLOCK
1 = DON'T SKIP BLOCK
  IF DON'T SKIP, NEXT BIT IS (S/D):
  0 = SMOOTH BLOCK
  1 = DETAIL BLOCK

INTER FRAME CODE ATOM MASK WORD ENCODING

FIG. 11

STORAGE OF DECODED CODE VECTORS IN OFF-SCREEN FRAME BUFFER MEMORY

METHOD AND APPARATUS FOR VECTOR QUANTIZATION FOR REAL-TIME PLAYBACK ON LOW COST PERSONAL COMPUTERS

FIELD OF THE INVENTION

The invention pertains to an improved vector quantization method and apparatus for compressing image data such as color video data for low cost, real-time decompression and playback, for example from a low bandwidth storage device such as a CD-ROM apparatus.

BACKGROUND OF THE INVENTION

Video is a critical part of many applications such as entertainment, communications and training. In the past video data was represented exclusively in analog form which restricted the creation, storage and distribution of video to systems dedicated only to analog video. It is now possible to process video digitally which has greatly lowered the cost of using and creating video, and has allowed video to be created, stored and transmitted by general purpose digital computer equipment. This way of working with video is far less expensive and more convenient than use of analog means and has enabled many new ways of using and working with video.

Unfortunately, raw digital video represents a digital data rate of approximately 100 million bits per second of video. Storing and transmitting this raw data rate is difficult except with very expensive equipment and high performance digital communications links. A wide range of techniques have been developed to compress digital video in order to reduce this data rate to one that is far more manageable. Each compression technique has advantages for different applications.

One important compression technique is vector quantization ("VQ"). It is conventional to employ VQ to compress digital image data. See, for example, Robert M. Gray, "*Vector Quantization*," IEEE ASSP Vol. 1, pp 4–29 (April. 1984), U.S. Pat. No. 5,194,950, issued Mar. 16, 1993 to Murakami et al., and U.S. Pat. No. 5,067,152, issued Nov. 19, 1991 to Kisor et al.

Vector quantization of image data is based upon formatting the image pixels into image vectors that are then encoded by finding the best match to a set of code vectors in a "code book." The code vectors are in the same format as the image vectors, but do not necessarily exactly match any of the image vectors. The best match for each image vector is the code vector producing the least distortion when used to code the image vector. The image vector is coded by using the index of the code vector in the code book which produces the best match. Since the code book index comprises fewer bits than the image vector, compression is achieved. The quality of the decoded image depends entirely on the quality of the code book. The smaller the code book, the fewer code vectors it can contain and as a result, the average distortion caused by the coding process increases. The benefits of the smaller code book are higher compression ratio because of the fewer bits needed to represent the code book indices and faster compression performance because of the reduced searching. Larger code books allow better compression quality, but at the cost of reduced compression ratio.

The contents of the code book may either be fixed or may vary over time. Some conventional implementations use fixed code books to avoid transmitting the code book with the compressed data stream, thereby increasing the compression. The disadvantage of this technique is reduced quality since the code books have to be chosen based on typical image data and cannot be changed for images that differ significantly from the average. Fixed code books also make it easier to construct fixed structures for compression that do not require exhaustive searches of the code book such as tree structures. This decreases the time needed to compress an image.

Variable code books require new code books and new code entries to be computed during compression, increasing compression time and requiring transmission of the new code books and code book entries with the compressed data (decreasing the compression). The advantage of varying the code books is that the quality of the decoded images are is better because the code book dynamically adapts to the changing characteristics of the images being compressed.

It is well known to employ VQ techniques to encode and decode video data for video compression (and decompression) applications.

In performing VQ coding, the best match between an image vector and the code vectors of a code book is determined by computing the distance in N-space (where N is the number of components of the image vector) between the image vector and each code vector. The best match has the minimum distance between the two vectors. In preferred embodiments of the present invention (to be explained below), the distance is computed in the six-dimensional space of input image vectors and code book vectors having six components. In typical VQ implementations, the square of distance is computed since it is a mean square error (MSE) between the image vector and one of the code book vectors.

Consider an example in which input image vector $V^I$ comprises six components of YUV color video data as follows: $V^I=(Y_0^I, Y_1^I, Y_2^I, Y_3^I, U^I, V^I)$, where the first four components are Y (luminance) values, and the fifth and sixth components are U and V values, with each code book vector having form $V^C=(Y_0^C, Y_1^C, Y_2^C, Y_3^C, U^C, V^C)$. The MSE or square of the distance between these two vectors is given by:

$$MSE=[(Y_0^I-Y_0^C)^2+(Y_1^I-Y_1^C)^2+(Y_2^I-Y_2^C)^2+(Y_3^I-Y_3^C)^2+(U^I-U^C)^2+(V^I-V^C)^2].$$

The most common form of VQ compression uses a single code book at the coder and the decoder. This works acceptably for modest compression ratios and medium quality decoded images. It does not work well when both a high compression ratio such as 1 bit per pixel and high quality decoded images are simultaneously required. When using a single code book, increasing the quality requires a larger code book, but this causes a decrease in the compression ratio.

FIG. 1 is a block diagram of a conventional system for implementing VQ compression (using a single code book) and decompression on video data. The input analog video signal is digitized by a standard video A/D circuit into a standard format (YUV 4:1:1) digital video stream. The Y component carries the luminance information of each pixel and the U and V components carry the chrominance information.

The YUV color space is a common color space for digital video, and is similar to the YIQ color space in which the VQ method of cited U.S. Pat. No. 5,067,152 is implemented. The "4:1:1" nomenclature means that there are four Y samples for each U and V sample. This format takes advantage of the eye's lesser sensitivity to color detail compared to luminance detail.

The digital video is scaled and filtered before compression in FIG. 1 system. Because video (e.g., digital NTSC video) can represent images with a resolution as large as 720×482 pixels, it is often desirable to scale down each image to a smaller size to match the compressed data rate to the capabilities of the storage system or digital transmission method.

Still with reference to FIG. 1, the VQ encoder formats the pixels into image vectors and codes them using a code book. The image vectors can correspond to rectangular blocks of pixels. Some conventional encoders compare each block to be coded with the corresponding block from the last frame, and send a different code word if the blocks match within an acceptable threshold. The code indicating a match to the prior block can be of shorter length than the VQ code words, thereby saving data and improving the compression ratio. This simple form of interframe coding is described in U.S. Pat. No. 5,008,747 to Carr et al.

The compressed data stream consists of VQ code words and in systems that dynamically vary the code book, new code book entries. The compressed data can be transmitted over a digital communications link, stored on a conventional hard disk in a computer, or used to master a CD-ROM.

With reference to FIG. 1, the decoder receives the code words and looks up the code vectors in a code book. These code vectors are the decompressed image vectors. If the system uses interframe coding as in U.S. Pat. No. 5,008,747, the code for a block match causes the block from the prior frame to be reused. The decoded image vectors are then converted to RGB pixels by converting the YUV values in the image vectors into RGB values using a suitable color conversion method. Finally, the RGB pixels are stored in an RGB graphics frame buffer for display on a CRT monitor.

U.S. Pat. No. 5,067,152 teaches separating the image to be compressed into separate planes corresponding to separate components of a YIQ pixel. YIQ is a natural color space for digital video information where Y is the luminance information and I and Q carry the chrominance. It is common practice to subsample the chrominance information to reduce its resolution and therefore the amount of data in the image. U.S. Pat. No. 5,067,152 subsamples the chrominance channels by 2X in each dimension thereby reducing the chrominance data by a factor of four, uses a separate code book for each of the Y, I, Q planes, and devotes more code book entries to the Y code book than to the I and Q code books. The subsampling of the chrominance information and the smaller code books for the I and Q planes takes advantage of the well known property that the human visual system is very sensitive to detail in brightness variation and relatively insensitive to detail in color information. In U.S. Pat. No. 5,067,152, the separation of image data into three types with separate code books is fixed (the Y image plane is always encoded with the Y code book, etc.) and there is no dynamic separation of each type of image data by small blocks based on local image statistics or properties.

Another conventional method and apparatus for performing VQ encoding on an image data stream is described in U.S. Pat. No. 5,068,723, issued Nov. 26, 1991. The method described in this patent employs a code book having two sections (a "common" section and a "specific" section). A best match is identified between an input vector and the entries of the "common" code book section. If the match is sufficiently close, the input vector is replaced by the address of the appropriate common code book entry. Otherwise, a second matching operation is performed to identify a best match between the input vector and the entries of the "specific" code book section, and the input vector is replaced by the address of the appropriate specific code book entry (and a flag indicating that the address is for the specific, rather than the common, code book section). The specific and common code book sections are adaptively updated by transferring code vectors from one section to the other, depending on the frequency of their selection as a "best match" to the input image vectors.

Another conventional method and apparatus for performing a VQ operation on a stream of image data is described in U.S. Pat. No. 5,194,950. This reference teaches application of several VQ methods to compress image data vectors of an interframe difference signal, where each of such image data vectors is the difference between two corresponding vectors of two successive frames of input image data. One such VQ method employs multiple code books as follows. First, a best match is identified between an input vector and the entries of a first code book. If the match is sufficiently close, the input vector is replaced by the address of the appropriate first code book entry. Otherwise, a second matching operation is performed to identify the best match between the input vector and the entries of a second code book, and the input vector is replaced by the address of the appropriate second code book. In another VQ method described in this reference, the input vectors are processed in a bank of band pass filters. Components of the input vectors in different frequency band components are separately processed, with different code books (i.e., different ones of code books 651 and code books 652 of FIG. 26) being used to compress different ones of the frequency band components. In several of the VQ methods described in this reference, a block discriminator unit is employed to compare successive blocks of input vector data. For each block determined to be sufficiently similar to a preceding block, the input vectors do not undergo usual VQ encoding (i.e., are not replaced by addresses or indices of code book entries), but are instead replaced by bits indicating that they are assigned the same values as corresponding vectors of the preceding block.

SUMMARY OF THE INVENTION

The improved vector quantization (VQ) method and apparatus of the invention compresses color video data (or other image data) for low cost, real-time playback from low bandwidth storage devices such as conventional CD-ROM units, and optionally also performs real-time decompression of the compressed data. The method is highly asymmetric, devoting a vast majority of its complexity and computation load to the compression process, thus enabling decompression to be performed by low-cost, conventional microprocessors programmed with appropriate software.

The input image signal (a video signal in preferred embodiments) is initially digitized, and optionally filtered and scaled. The digitized image is a sequence of frames, each comprising a set of rectangular blocks of pixels. The pixels are dynamically classified or separated into two or more types according to the level of detail present in each block. The data is formatted into image vectors (one or more vectors per block), and two or more code books (one for each type of data) are employed to perform VQ encoding on the data. Each vector is encoded using the code book which matches the data type of the block which contains the vector. In the compressed data stream, the type of each code word is indicated by one or more mask bits. If the image data is separated into two types ("smooth" and "detail"), only a single mask bit is needed to indicate the type of each block.

The type selection mask bits are packed into mask words which are part of the compressed data stream. The mask words can also include "interframe skip" mask bits, so that interframe coding can be performed very simply as follows.

Each frame of image data is classified as either a keyframe or an interframe. If a block (of an interframe to be encoded) matches a corresponding block from the previous frame (either a keyframe or another interframe) to within a set tolerance, the image vector(s) comprising the block are not coded and instead, a "skip" bit is set in the mask word stream indicating that the block is to be skipped.

The compressed data stream consists of code words, code book updates, and mask bits. Some mask bits indicate the data type of each VQ code word and others indicate whether an image block was skipped as part of interframe coding. Alternatively, fixed code books are used so that no code book updates are needed in the compressed data stream, or a combination of fixed code books and dynamically varying code books is employed. The compressed data can be transmitted or stored in a conventional manner.

To decode compressed data in accordance with the invention, the decoding means (which can be a low-cost computer programmed with software for implementing the decoding method) reads the mask words to determine which code book to use for decoding each code word. If an interframe skip bit is set for a block, the corresponding block from the previously decoded frame is used without modification. Otherwise, each code word is replaced with the corresponding code book vector from the appropriate code book. The code book vectors generated by the decoding process are reconverted to pixels, and can then be color converted (for example, to RGB pixels) for display on a color CRT.

For convenience, the method of the invention will sometimes be referred to as the "Compact Video Codec" method, the "CVC" method, or "CVC."

The CVC method processes keyframes of the input data differently than interframes. For typical, high quality, CD-ROM rate movies, CVC designates a frame of input data as a keyframe approximately once per half second (about once per 12 to 15 frames), and each time a large scene change occurs between frames. The first frame of input data is always considered a keyframe. The keyframes are encoded using a VQ technique, while in the interframes, groups of pixels that match a corresponding group in the previously processed frame are encoded to a single match bit, and those that do not match are encoded using the VQ method.

CVC preferably adapts the VQ code books with each frame of input data by computing new code book values that better fit the current frame. The new code book entries are transmitted with the compressed data stream. CVC can also improve the VQ code books by creating more entries as needed and then transmitting them in the compressed data stream. This allows CVC to start with a small number of code book entries to limit the data rate, and then increase the entries when bandwidth becomes available due to the occurrence of a highly compressed frame.

In preferred embodiments, each input data frame ("detail frame") is organized into blocks ("detail" blocks) each comprising N input vectors (in one case, N=4). Preferably, each input vector ("detail input vector" or "detail vector") comprises four Y (luminance) component values, one U (chrominance) value, and one V (chrominance) value, and has form (Y,Y,Y,Y,U,V). When the input data pixels are classified into two types (pixels from blocks having a low level of detail or low spatial frequency content, and those from blocks having a high level of detail or high spatial frequency content), each keyframe undergoes VQ encoding as follows. A "smooth" frame is generated for the keyframe, preferably with half the resolution of the keyframe. This can be done by filtering each of the Y, U, and V component images of the keyframe in a separate 1:3:3:1 filter, applying each filter first in the horizontal direction to reduce resolution by one half, and then in the vertical direction to produce the final smooth image.

Like the keyframe (a "detail frame"), the smooth frame is organized into blocks ("smooth" blocks). Each smooth block comprises one smoothed input vector consisting of four smoothed components $Y^S$, one smoothed component $U^S$, and one smoothed component $V^S$. Each detail vector $(Y_0, Y_1, Y_2, Y_3, U, V)$ and each smooth vector $(Y^S_0, Y^S_1, Y^S_2, Y^S_3, U^S, V^S)$ is treated as a vector in a six-dimensional space.

During compression, each detail block is treated in one of two ways. If there is little variation between the pixels in the detail block, the detail block is replaced by the corresponding smooth block, and the smooth block then undergoes VQ compression. Otherwise, the detail block itself undergoes compression. Two code books are employed to perform the compression: one for input vectors of detail blocks, and the other for input vectors of smooth blocks. To perform compression, the mean squared error (MSE) between an image vector (of a detail or smooth block) and each code book vector (of the appropriate code book) is computed, and the matching code book vector is the entry with the smallest MSE value. The image vector is coded by using the index value for the best matching code book entry. Preferably, each code book has 256 entries, so the code word (index value) for an image vector will always be an 8-bit value.

Each interframe is processed as follows. A "smooth" frame is generated for the interframe, just as for a keyframe. However, before VQ encoding a vector of an interframe, the block from which it comes is first compared to the corresponding block in the previous frame. The MSE between the vector(s) in the current block and those of the block in the previous frame is computed. If the MSE between the blocks does not exceed a threshold set by the desired data rate, an interframe block match has occurred and the current block will not be coded. Instead a "skip" bit will be set in the data stream to indicate that the current block is to be skipped. All image vectors of an interframe that are not skipped are VQ encoded in the same way as are image vectors of a keyframe.

The inventive compression method is adaptable to a wide range of frame sizes of the input data and to a wide range of playback data rates that can be chosen by the user. Typical embodiments of the invention can compress input video to achieve a compression ratio of one bit per pixel.

The inventive compression method is highly adaptable to variation of the input data stream while maintaining a desired compressed data rate. The user can initially select the compressed data rate, and in response, a computer programmed to implement the invention performs internal adjustments affecting the number of code book table entries and the proportion of interframes and keyframes to conform the compression algorithm to the selected data rate.

Another aspect of the invention is the specification of the compressed data stream. The data stream is preferably organized in a way that is easy to interpret and decode on low cost microprocessors. This specifically includes a structure that allows decoding without reading ahead in the data stream to find a necessary piece of information, to eliminate the need for buffering the compressed data stream in order to find information later in the data stream that may be needed to interpret data earlier in the data stream.

Preferably, new code books are included at the start of each compressed keyframe in the compressed data stream, so that the code books can be loaded at the decoder prior to starting decoding of the code words. In a preferred embodiment, each mask bit consists of a single bit to indicate the type of each code word. To decode either a compressed keyframe or interframe, the processor decoding the data stream first loads or updates the code books. It then fetches a 32-bit mask word and loads it into an internal register. It then tests the mask bits in order to determine whether the next image vector was skipped, and if not what type it belongs to. When an image vector is skipped, the processor moves to the next position in the image being decoded and does not read a code word from the data stream. When an image vector is not skipped, the processor tests the mask bits to determine the type of the image vector, reads the next code word from the data stream and decodes the vector using the code book selected by the type of the image vector specified in the mask bits. If the type selection bit indicates a smooth block, only a single code word is read from the data stream and decoded. If the type bit indicates a detail block, there will be four code words for that block that are read from the data stream and decoded The decode image vector(s) is converted to RGB color and then written into the graphics frame buffer for display. When all of the mask bits from a mask word have been exhausted, the processor knows that the next 32-bit word will be the next mask word.

BRIEF DESCRIPTION OF THE DRAWINGS

FIG. 6 is a diagram representing the overall format of a compressed frame of data generated by a preferred embodiment of the invention.

FIG. 7 is a diagram representing the format of a portion of a compressed frame of data generated by a preferred embodiment of the invention.

FIG. 8 is a diagram representing the format of a portion of a compressed frame of data generated by a preferred embodiment of the invention.

FIG. 9 is a diagram representing the format of a portion of a compressed frame of data generated by a preferred embodiment of the invention.

FIG. 10 is a diagram representing the format of a portion of a compressed frame of data generated by a preferred embodiment of the invention.

FIG. 11 is a diagram representing the format of a portion of a compressed frame of data generated by a preferred embodiment of the invention.

FIG. 12 is a table of atom type codes employed in a compressed frame of data generated by a preferred embodiment of the invention.

DETAILED DESCRIPTION OF THE PREFERRED EMBODIMENTS

Preferred embodiments of the Compact Video Codec (CVC) method of the invention treat each frame of an input video data stream as either a keyframe or an interframe. Keyframes are compressed on their own using a VQ compression technique. Interframes are coded in a manner taking into account the contents of the prior frame (which can be a keyframe or another interframe), with groups of pixels that match the same group in the previous frame encoded to a single match bit, and those that do not match encoded using the VQ compression technique. A keyframe typically occurs once every 15 frames to allow random access to the compressed data stream. When a large scene change occur between consecutive frames, CVC treats the later frame as a keyframe.

In preferred embodiments, the code books employed for VQ compression are dynamically changed with the video stream. A new set of code books is generated for each keyframe, and individual code book entries may be updated while encoding interframes. The new code books and code book entries are transmitted with the compressed data stream.

Preferred embodiments of CVC process input digital video data in a YUV color space. This is a natural color space for dealing with digital video which separates luminance information (Y data) from chrominance information (U and V data). Since the human eye is less sensitive to high frequencies of chrominance information (than to high frequencies of luminance information), the UV values are typically sampled less often than the Y values.

Figure 1:
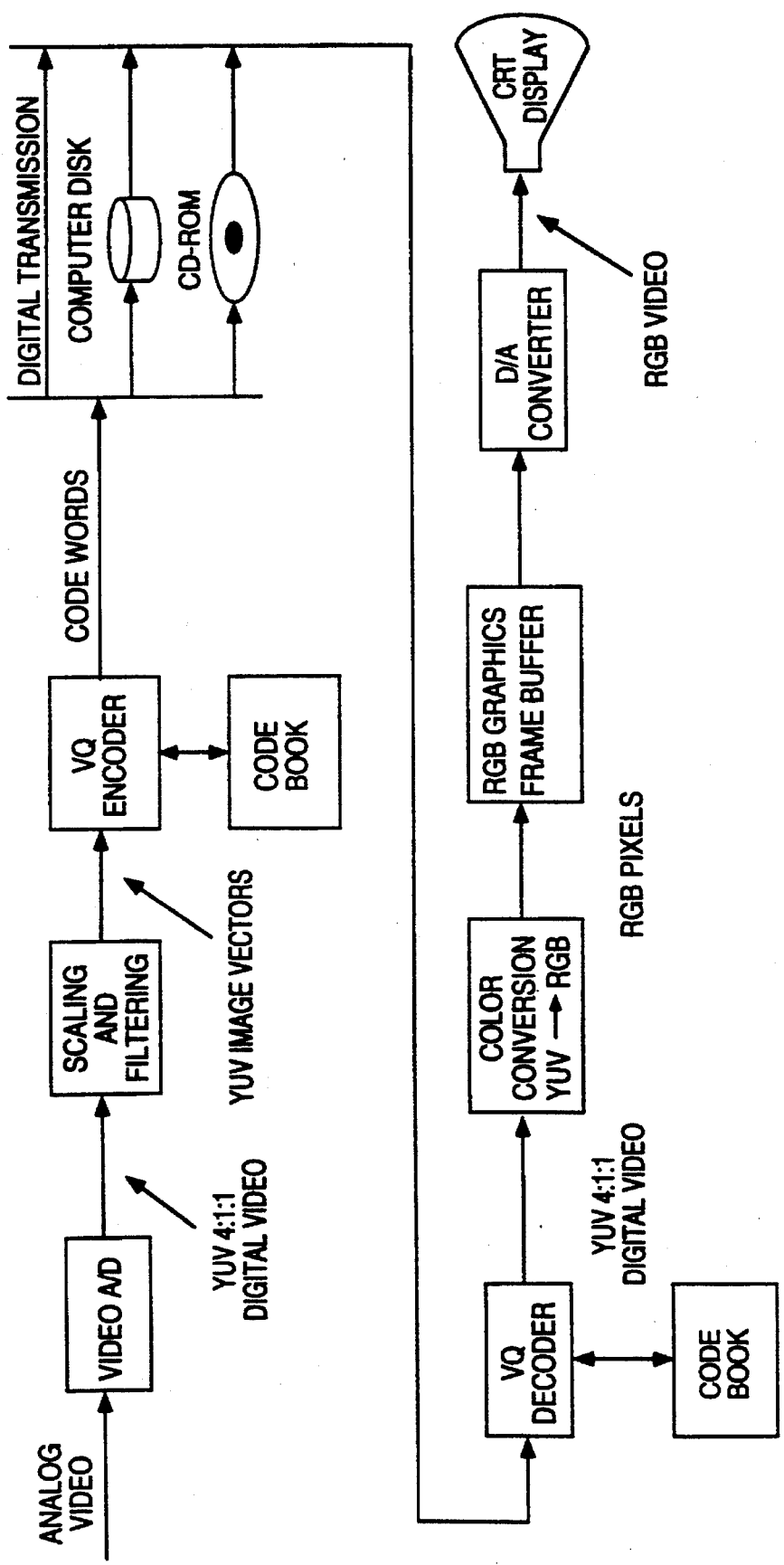
FIG. 1 is a block diagram of a conventional VQ encoding and decoding system.
Figure 2:
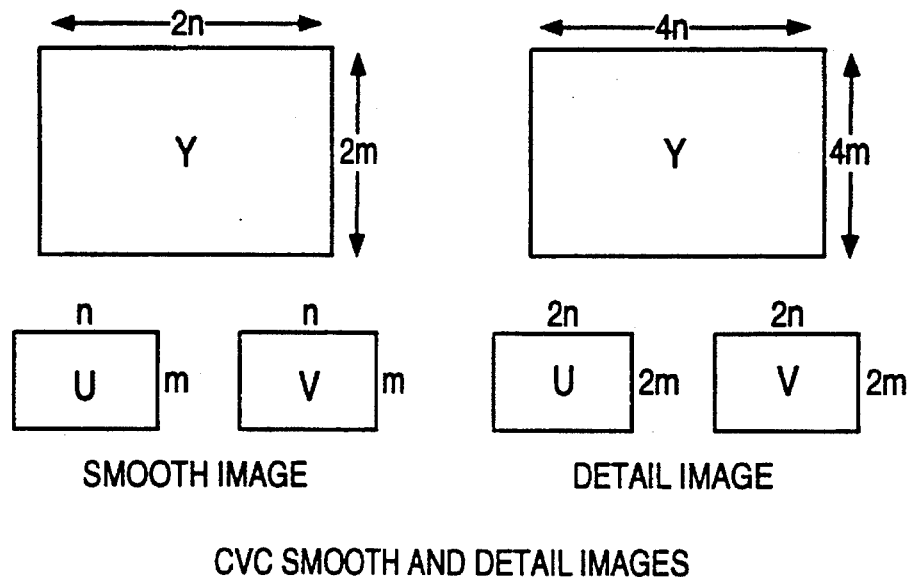
FIG. 2 is a diagram representing "detail image" data and "smooth" image data processed by a preferred embodiment of the invention.

In preferred embodiments, CVC treats each frame of input video data as a full resolution and half resolution pair called "detail" and "smooth" images. Typically in such embodiments, both the smooth and detail images consist of YUV data, with the UV samples having half the resolution of the Y samples. The detail image is the full resolution input image (preferably in YUV 4:1:1 format), and the smooth image (generated by filtering the detail image) has lower (preferably half) resolution than the detail image. With reference to FIG. 2, in preferred embodiments, a sequence of 4m lines of 4n samples of Y data of the detail image corresponds to a sequence of 2m lines of 2n samples of smoothed Y data of the smooth image, and a sequence of 2m lines of 2n samples of U (or V) data of the detail image corresponds to a sequence of m lines of n pixels of smoothed U (or V) data of the smooth image.

Each detail image is a frame of input data organized into rectangular blocks ("detail" blocks), with each detail block comprising one or more input vectors (denoted herein as "detail input vectors" or "detail vectors").

To compress a keyframe (a detail frame comprising detail blocks), CVC generates a "smooth" frame corresponding to the keyframe before performing compressing the detail vectors of the detail frame. Typically, the smooth frame typically has half the resolution of the detail frame, and is generated as follows: each of the Y, U, and V component images of the detail frame is filtered in a separate 1:3:3:1 filter, with each filter applied first in the horizontal direction to reduce resolution by one half, and then in the vertical direction to produce the final smooth image. In both the smooth and detail images, the U and V chrominance values are preferably subsampled to half the resolution of the Y luminance components (as indicated in FIG. 2). The smooth frame is organized into blocks of less than full (e.g., half) resolution data known as "smooth" blocks.

In one example, the detail image consists of Y, U, and V values in YUV 4:1:1 format, each detail vector has form (Y,Y,Y,Y,U,V) and comprises four Y component values, one U value, and one V value. Each Y, U, and V value is represented by an 8-bit binary word, and each detail block consists of four detail vectors. In this case, each smooth block preferably comprises one smoothed input vector consisting of four smoothed components $Y^S$, one smoothed component $U^S$, and one smoothed component $V^S$. To compress a keyframe comprised of such detail blocks, CVC treats each set of four Y values (or smoothed Y values) and a UV pair (or smoothed UV pair) as a six-component vector, so that each smooth block is a single six-component vector while each detail block is a set of four, six-component vectors.

Figure 2A:
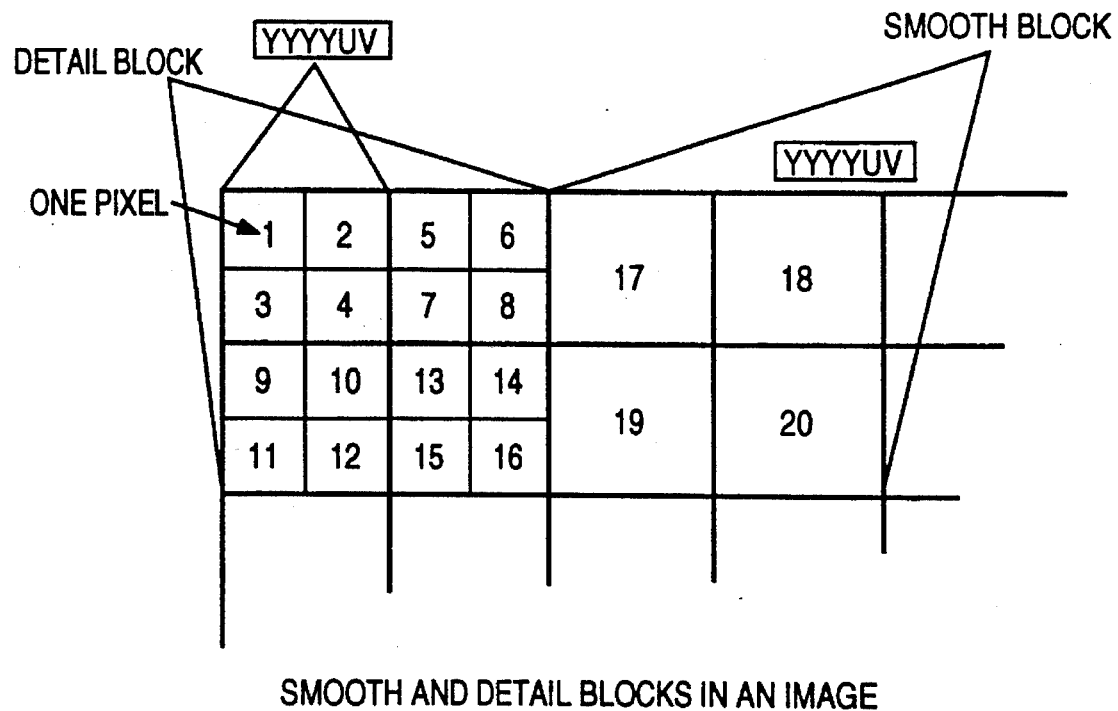
FIG. 2A is a diagram representing "detail" and "smooth" blocks of image data processed by a preferred embodiment of the invention.

FIG. 2A illustrates the concept of smooth and detail blocks, with a detail block shown side-by-side with a smooth block in the same image. The detail block consists of four image vectors: a first comprising pixels 1–4, a second comprising pixels 58, a third comprising pixels 9–12, and a fourth comprising pixels 13–16. The smooth block consists of one image vector comprising smoothed pixels 17–20. In an actual implementation, entire smooth and detail images would typically be stored separately with the Y, U and V components kept apart. The partitioning of the detail image into 4×4 blocks requires the horizontal and vertical resolution of the frames to be evenly divisible by four.

To compress a keyframe comprised of detail blocks of the type shown in FIG. 2A, CVC treats each input detail block in one of two ways. If there is little variation between the pixels in the detail block, the detail block is replaced by the corresponding smooth block, and the smooth block then undergoes compression. Otherwise, the detail block itself undergoes compression.

Figure 2B:
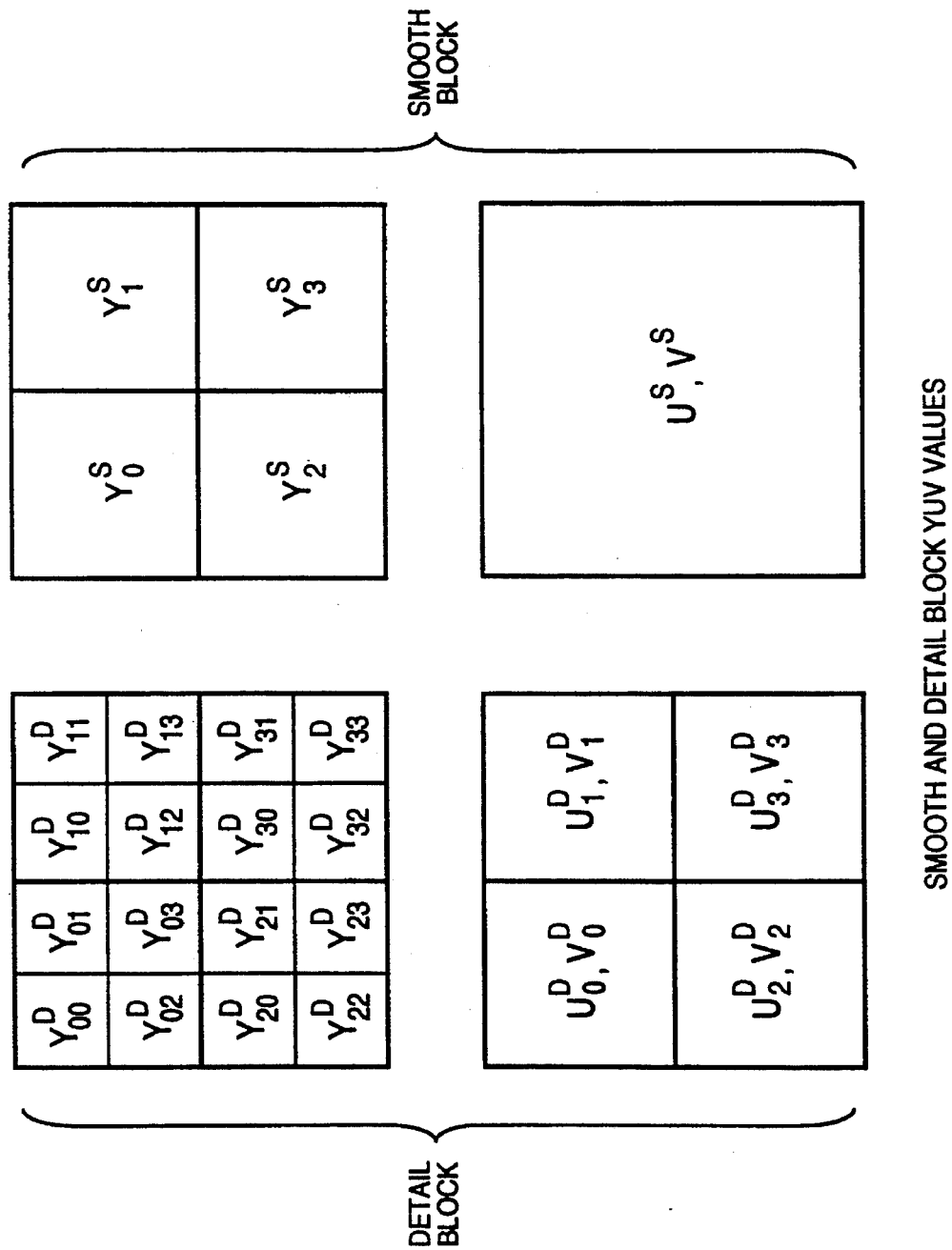
FIG. 2B is a more detailed diagram representing a "detail" block and a "smooth" block of image data processed by a preferred embodiment of the invention.

More specifically, corresponding smooth and detail blocks (from the same place in the image) are compared to determine if the smooth or detailed block should be compressed. The preferred method for determining if a smooth or detailed block should be compressed generates a Mean Squared Error (MSE) value from the difference between the smooth and detail blocks. In FIG. 2B, the YUV values for a smooth block and a detail block are shown. The smooth block values have a superscript "S" while the detail block values have a superscript "D." To compute the MSE, the smooth values are mapped on top of the detail block, the differences between corresponding smooth and detail values are computed, and the squares of the differences are summed.

The Mean Squared Error between the two blocks is given by:

$$MSE = \sum_{i,j=0-3} \{(Y_{ij}^D - Y_i^S)^2 + (U_j^D - U^S)^2 + (V_j^D - V^S)^2\}$$

If the MSE exceeds a preset threshold (to achieve a desired compressed data rate determined by the user), CVC selects the detail block for compression. If the MSE does not exceed the preset threshold, CVC selects the smooth block for compression. This selection of smooth or detail for a block is one of the critical factors that controls the compressed data rate since a detail block will require four VQ code words in contrast with the single VQ code word required for a smooth block.

In summary, to perform VQ compression on a selected (smooth or detail) block, the CVC method sequentially processes each image vector of the selected block using one of two code books: a detail code book for each detail block, and a smooth code for each smooth block. Each code book typically has the same number of entries (for example, 256 entries) known as "code book vectors." For each image vector of the selected block, CVC computes the MSE between the image vector and each code book vector of the corresponding code book, and identifies the code book entry with the smallest MSE value as a "matching code book vector." The image vector is coded by being replaced by the index value (address within the code book) of the best matching code book entry. In preferred embodiments, each code book has a user-controllable number of entries (not to exceed 256 entries), so that the code word for an image vector can be an 8-bit value. Use of two code books and mask bits indicating the type of each 8 bit code word provides a more efficient coding scheme than using a single 512 entry code book. A single 512 entry code book is less efficient because it requires packing 9 bit code words into a byte oriented data stream. Furthermore, the subsampling of the smooth blocks to one-half resolution affords a higher compression ratio on the blocks lacking detail while retaining the necessary details in the blocks having detail.

Figure 3:
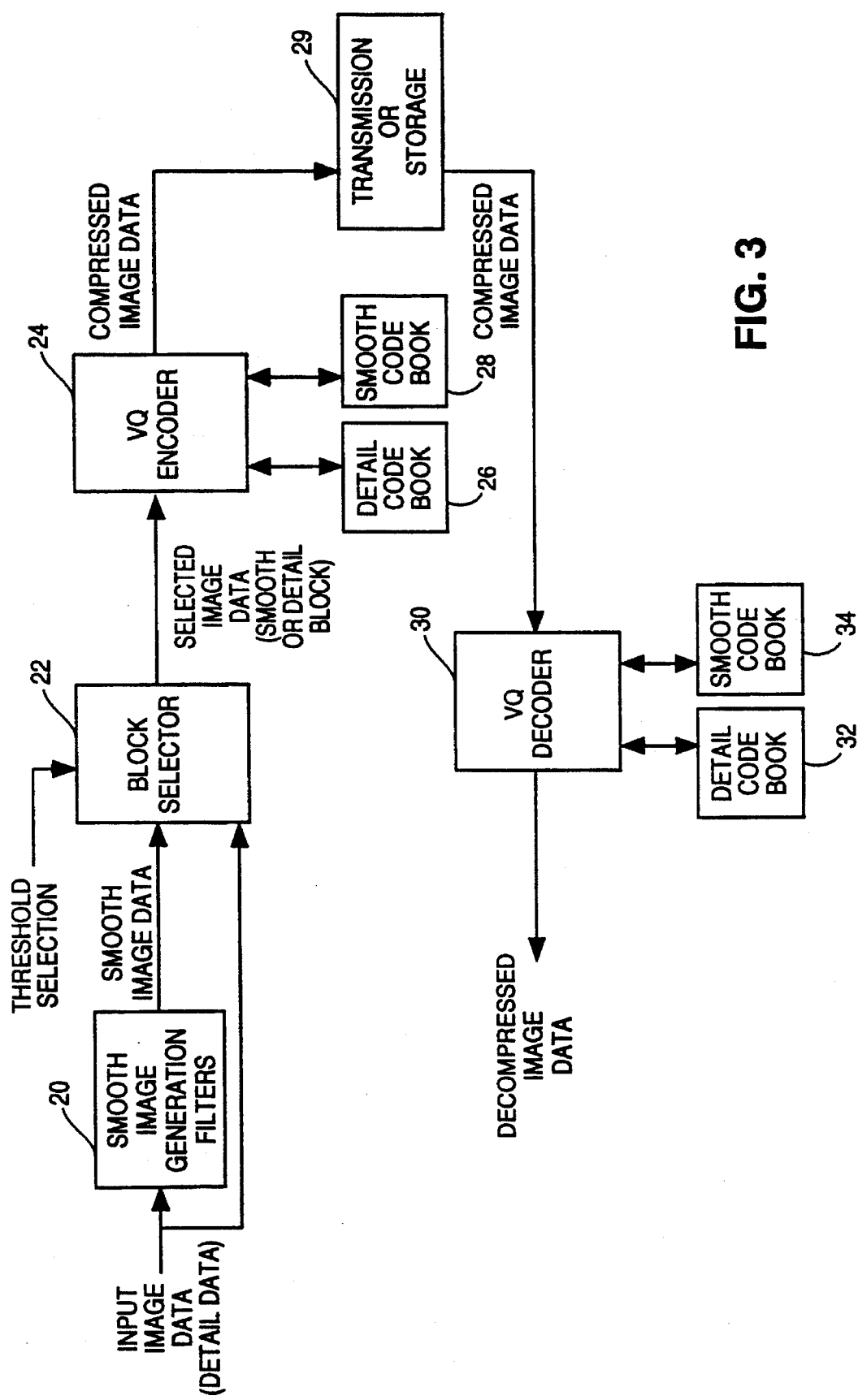
FIG. 3 is a block diagram of a system for implementing the method of the invention.

FIG. 3 is a block diagram of a system for implementing the method of the invention. "Detail frames" of a digital image data stream are filtered by filter bank 20 to convert them into "smooth frames" of a smooth image data stream. Filter bank 20 preferably includes the above-described 1:3:3:1 filters.

Block selector 22 performs the above-described operations of comparing each detail block with a corresponding smooth block (by generating an MSE value), outputting the detail block if the MSE exceeds a preset threshold (determined by an externally supplied threshold selection signal), and outputting the smooth block if the MSE does not exceed the preset threshold.

VQ encoder 24 uses one of code books 26 and 28 to compress each block received from block selector 22. Each of detail code book 26 and smooth code book 28 is a look-up table which stores code book vectors written to it by encoder 24. For encoding each detail block, encoder 24 uses detail code book 26 only. For encoding each smooth block, encoder 24 uses smooth code book 28 only.

The compressed image data stream output from encoder 24 preferably comprises compressed frames having the format shown in FIG. 6 (discussed below) and is transmitted or stored (in transmission or storage unit 29). Unit 29 can be a low bandwidth storage device such as a conventional CD-ROM device.

VQ decoder 30 receives the compressed data stream from unit 29, and decodes it using code book entries from code book 32 or 34. Before decoding each frame of compressed data, decoder 30 updates the contents of detail code book 32 and smooth code book 34 (using data included in the compressed data stream) to make them identical, respectively, to the contents of code book 26 and code book 28 during compression of the frame. Decoder 30 outputs a decompressed version of the compressed image data stream (a somewhat degraded, but still high quality, version of the original detail data) for display or further processing.

FIG. 3 can be implemented in hardware, or in software (by an appropriately programmed general purpose digital computer system). One general purpose digital computer can be programmed to perform only the functions of elements 20 through 28 of FIG. 3 (to generated compressed image data), and another general purpose digital computer can be programmed to perform only the functions of elements 30, 32, and 34 of FIG. 3 (to decompress a stream of compressed image data).

Figure 3A:
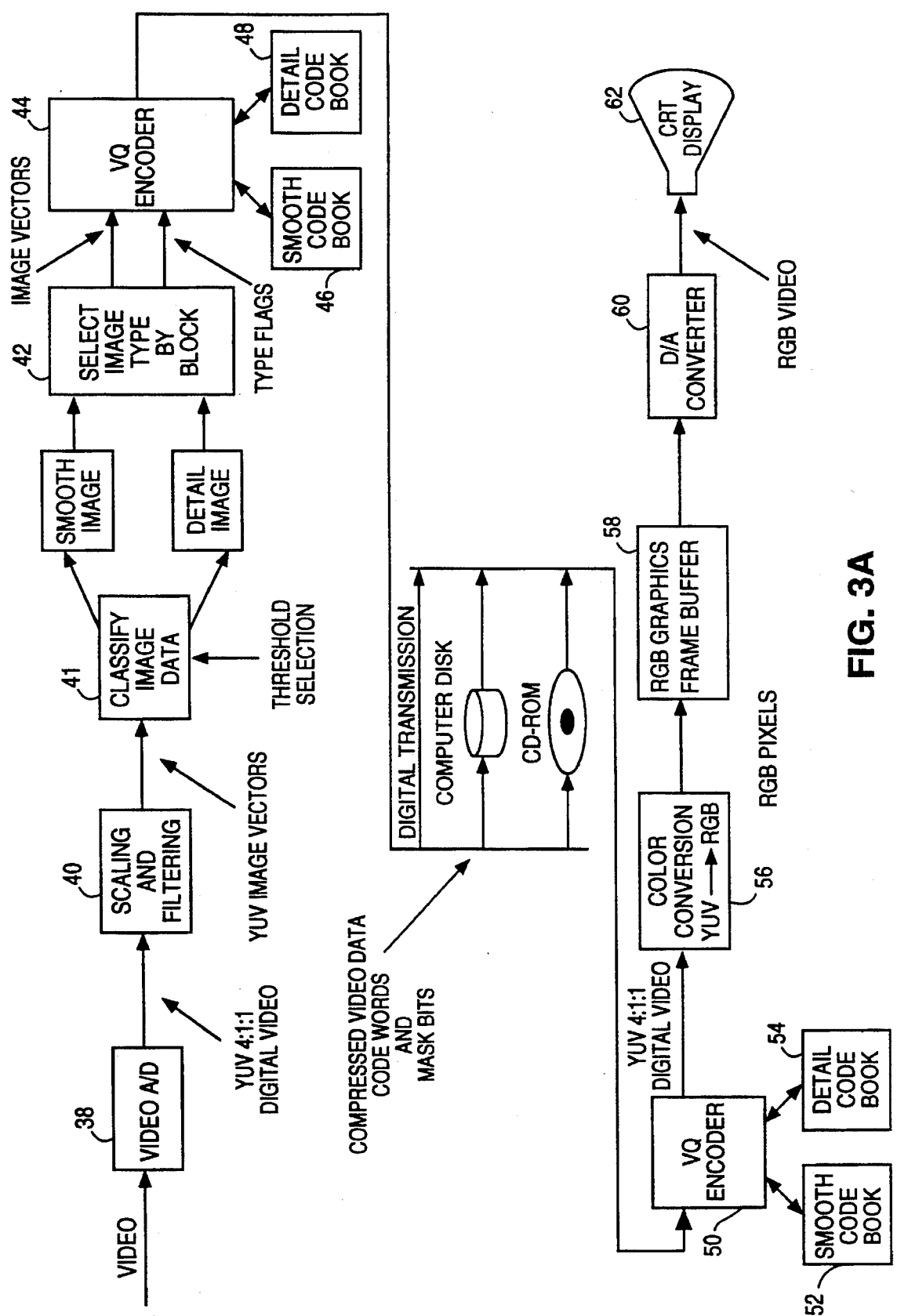
FIG. 3A is a block diagram of a system for implementing a preferred embodiment of the inventive method.

FIG. 3A is a block diagram of a system for implementing a preferred embodiment of the method of the invention. In the FIG. 3A system, a video signal is converted to a stream of YUV digital video data in YUV 4:1:1 format in video analog to digital converter 38. The digital video stream undergoes scaling and filtering in unit 40, and filter bank 41 (which preferably includes a bank of the above-described 1:3:3:1 filters) then converts each detail frame of the scaled and filtered digital video into a smooth frame.

Block selector 22 receives both the detail and smooth image data streams, and performs the above-described operations of comparing each detail block with a corresponding smooth block (by generating an MSE value), outputting the detail block if the MSE exceeds a preset threshold (determined by an externally supplied threshold selection signal), and outputting the smooth block if the MSE does not exceed the preset threshold.

VQ encoder 44 uses one of code books 46 and 48 to compress each block received from block selector 42. Detail code book 48 and smooth code book 46 are look-up tables which store code book vectors written to them by encoder 44. For encoding each detail block, encoder 44 uses detail code book 48 only, and for encoding each smooth block encoder 44 uses smooth code book 46 only. The compressed data stream generated by encoder 44 includes an eight bit code word (index value) for each input image vector, and a set of map bits that indicate if each code word is a smooth or detail code word (i.e., if each code word is an index to an entry of the smooth code book, or an index to an entry of the detail code book). The code words and map bits are interleaved to allow small groups of compressed blocks to be decoded without the need to look ahead in the data stream.

The compressed image data stream output from encoder 44 comprises compressed frames having the format shown in FIG. 6 (discussed below) and is stored (for example, in the form of a CD-ROM disk or magnetic computer disk) or transmitted.

VQ decoder 50 receives the transmitted (or played back) compressed data stream and decodes it using code book entries from code book 52 or 54. Before decoding each frame of compressed data, decoder 50 updates the contents of detail code book 54 and smooth code book 52 (using data included in the compressed data stream) to make them identical, respectively, to the contents of code book 48 and code book 46 during compression of the frame. Decoder 50 outputs a decompressed version of the compressed image data stream (a somewhat degraded, but still high quality, version of the YUV video data output from scaling and filtering unit 40) to color conversion unit 56. Unit 56 converts the decompressed data to RGB video, and writes the RGB video into RGB graphics frame buffer 58. Frames of RGB video are read from frame 58, converted to analog RGB video in video D-to-A converter 60, and displayed on CRT display 62.

FIG. 3A can be implemented in hardware, or in software (by an appropriately programmed general purpose digital computer system). For example, a general purpose digital computer can be programmed to perform only the functions of elements 41 through 48 of FIG. 3A (to generated compressed image data), and another general purpose digital computer can be programmed to perform only the functions of elements 50 through 58 of FIG. 3A (to decompress a stream of compressed image data). Each general purpose computer should include a microprocessor (programmed with software for implementing the encoding and/or decoding steps of the invention) and memory (for storing the code books and other data employed during processing). Each computer should include means for writing compressed image data to a storage device (such as a CD-ROM device) and/or reading compressed image data from the storage device. The computer for performing decoding should include color conversion means for converting decompressed YUV video into RGB video pixels and a frame buffer for storing the RGB pixels (or means for interfacing with such a color converter and frame buffer).

Substantially all the complexity of the VQ compression operation (and the overall CVC method) is in the techniques for creating the code books, updating the code book vectors with each frame, and managing the data rate and the code book size. Preferably, the CVC method uses two code books with a maximum of 256 entries each. Since minimizing the code book size will increase the compression ratio, the compression algorithm uses a user selected data rate to control the code book size and can vary it during a video sequence.

We next describe the steps performed by the CVC method to create smooth and detail code books before commencing compression of a keyframe. Since random access must be possible to keyframes, the entire code books must be sent with the compressed keyframe. The new code books are created by a process known in the field as training (an example of which is described in the above-cited paper by Gray). The set of image vectors used during the training process is called the training set. In this embodiment, the training set is all of the image vectors (all "detail" vectors of the keyframe and all "smooth" vectors of the smooth image corresponding to the keyframe).

A technique called "splitting" is used that starts with a single code vector and successively "splits" each code vector into two vectors that more accurately match the image vectors in the keyframe than the original code vectors. This continues until the desired number of code vectors is reached, or the average error reaches a target. The process is performed separately for smooth and detail code books, in the sense that the detail code book is generated using all detail vectors of the keyframe, and the smooth code book is generated using all smooth vectors of the smooth image corresponding to the keyframe. To generate each code book, the initial code vector is the "centroid" (the geometric "center" of a set of vectors in six-space) of the all of the training set. This initial code vector is split into two code vectors by creating a new code vector that is computed by choosing the first image vector in the set that matches the code vector to be split that is not identical to the code vector. There are also many other methods for code vector splitting that are known in the field. The training set is then matched against the two code vectors and the code vectors are replaced by the centroids computed from the two sets of training vectors. This process is continued to further split the two code vectors into four and so on. As the code vectors become split further, the number of training vectors that match a particular code vector will decrease. At some point, using a random number exored against an existing code vector may create a code vector that is not the closest match to any of the training vectors, and so would be a bad code vector. When the number of training vectors matching a code vector becomes small, the code vector is split by choosing one of the training vectors as the new code vector prior to computing the centroids. This guarantees that at least one training vector will match one of the code vectors. Once the average error between the training vectors and code vectors reaches a desired limit, or the desired maximum number of code vectors are reached, the training process is stopped and the keyframe is coded with the new (smooth and detail) code books.

After the new smooth and detail code books are created, the image vectors of the keyframe are then coded (by coding either the detail vectors or the corresponding smooth vectors). The VQ coder selects the correct code book to use depending upon whether the image vector comes from a smooth or detail block. The code book is then searched for the code vector that has the minimum distance from the image vector to be coded. The code word used to code the image vector is then the index or address in the code book of the best match code vector. To indicate a smooth or detail block, a bit is set in the data stream to tell the decoder which code book to use.

Figure 4:
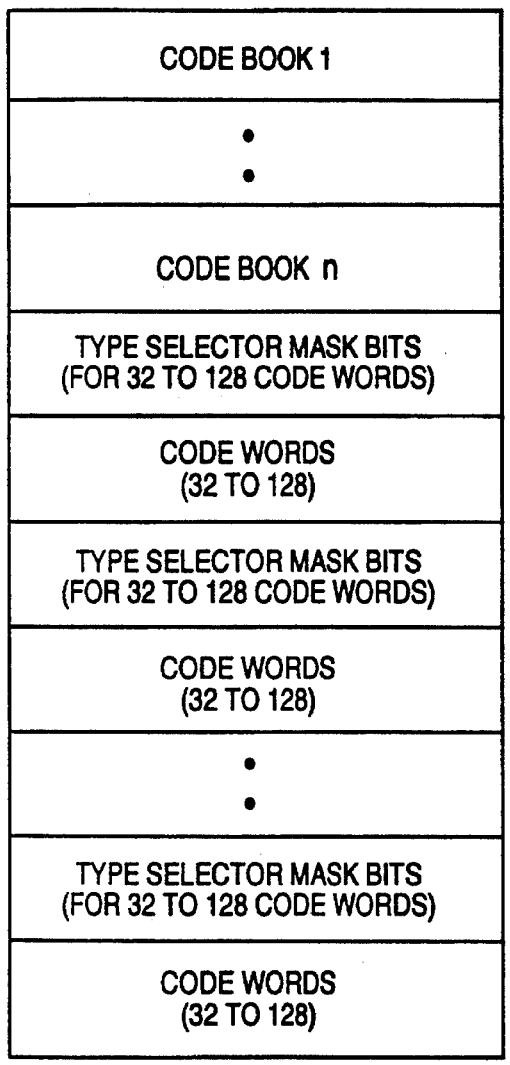
FIG. 4 is a diagram representing the format of a compressed keyframe generated by a preferred embodiment of the invention.

The compressed data stream for a keyframe is made up of the new code books, code words and mask words (preferably 32-bit mask words) whose bits indicate whether the following code words are for smooth or detail blocks. FIG. 4 is a diagram of the preferred format of a data stream determining a compressed keyframe.

We next describe the method for compressing each interframe. Interframes are coded presuming the existence of a previous frame. Before a vector is coded in an interframe, the block that it comes from is first compared to the same block in the last frame. The MSE between the vector(s) in the current block and those of the block in the last frame is computed. If the MSE between the blocks does not exceed a threshold set by the desired data rate, an interframe block match has occurred and the current block will not be coded. Instead a "skip" bit will be set in the data stream to indicate that the current block is to be skipped. During decoding, this causes the block to remain unchanged with this frame. All image vectors that are not skipped are then coded using the same VQ technique used in keyframes.

Figure 5:
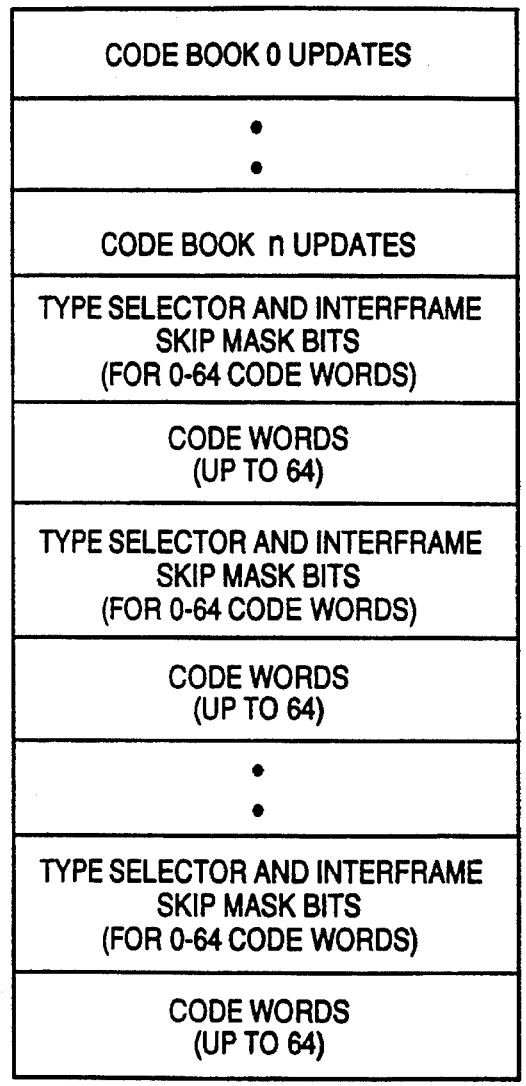
FIG. 5 is a diagram representing the format of a compressed interframe generated by a preferred embodiment of the invention.

The compressed data stream for an interframe is made up of new code book entries, code words and 32 bit mask words whose bits indicate whether a block has been skipped and if not whether the code word is for a smooth or detail block. FIG. 5 is a diagram of a preferred format for the data stream determining a compressed interframe.

During the coding process of an interframe, information is collected that is then used to update each code book. Each image vector that is coded with a particular code book vector is saved associated with that code vector. After the interframe is coded, a new code book vector is computed that is the centroid of the image vectors coded by that code vector. This new code vector will always be a better match with less error to the image vectors than the old code vector. The encoder then decides how many of the code vectors will be updated with the interframe. This is done by computing the size of the coded image that has just been completed. The user selected data rate and data allowed per frame is then compared to this value. If there is available space in the compressed frame, new code book values are put in the compressed data at the start of the compressed frame. The code book entries that are updated are those that have changed the most from the last frame. The magnitude of the change is the distance in six-space between the old code vector and the new one. The new vectors are sorted in order of magnitude of change, and in this order, as many as can be fit in the frame as allowed by the data rate are transmitted with the frame. During decoding, the code books will be updated with the new code book entries prior to decoding the image code words, so the new code vectors will be used for decoding the code words in the frame. The result is that the decoded blocks will more accurately match the original image blocks. In this sense, the VQ encoding method of the invention is adaptive to the data stream being coded.

In addition to refining the code vectors with each frame, the CVC algorithm also creates new code book entries. If not all 256 entries are used in a code book, the CVC algorithm will use available data bandwidth in a compressed frame to send new code book entries. The new code vectors are created by using the splitting technique described earlier. If all of the code book entries are in use, the CVC algorithm preferably detects code vectors that have not been used recently and replaces them with new code vectors that will be used with the current frame. The CVC algorithm maintains for each code vector the frame number when it was last used. If a code vector has not been recently used, it will be replaced with a new code vector when there is bandwidth available to do so. The new code vector will be generated by splitting an existing code vector. The code vectors chosen to be split are selected by the average error between the code vector and the image vectors that have been coded with that vector in this frame. The code vectors with the most average error are split in order of their error.

Keyframes are inserted into the data stream for two reasons; to support random access to the compressed movie and when very large scene changes occur between two frames. The user typically specifies a regular placement of keyframes to support random access, such as once every half second or about once for every 12 to 15 frames. The CVC algorithm inserts additional keyframes whenever a large scene change is detected. A scene change is detected when the average error between the image vectors and the code vectors exceeds a threshold.

Since random access must be possible to keyframes, the entire code books must be sent with each compressed keyframe. Since a keyframe may be very different from the prior frame, the CVC algorithm computes new full code books at each keyframe. The new smooth and detail code books are computed using the image vectors of the keyframe as a training set, by performing the splitting technique described above. The image vectors are then coded as smooth or detail vectors, and the compressed data stream for a keyframe is made up of the new code books, code words, and mask words whose bits indicate whether the following code words are for smooth or detail blocks.

PREFERRED COMPRESSED DATA STREAM SPECIFICATION

The compressed data stream for the CVC consists of individual compressed frames from the original video sequence. The compressed frames internally hold new code book entries for the frame and the coded image vectors. The coded image is broken into separate tiles depending on its size. Frames up to 240×180 pixels or 43,200 total pixels in resolution are represented with a single tile, while frames larger than this (such as 320×240 frames) are represented by two tiles. When the image is broken into two tiles each tile can also hold new code book entries. Both frames and tiles may be keyframes (keytiles) or interframes (intertiles).

A compressed frame is constructed recursively from "atoms". Each atom begins with a 32 bit long word whose first byte is an atom type code and the remaining 24 bits is the length of the atom in long words including the first long word. All atoms must be an integer number of long words in length, and if the data within the atom does not fill out an integer number of long words, the end of the atom is padded with 1 to 3 unused bytes. The length in first word of the atom when added to a long word pointer to the first word of the atom produces a pointer to the next independent atom. In the case of the frame atom, adding the length to a long word pointer to the first word of the atom will move the point to the first word of the next frame. At the lowest level within the frame are code book atoms and code atoms. The code atoms hold VQ code indices and the code book atoms hold new code book entries. The code atoms and code books atoms may not hold any other atoms within them and are truly atomic. Tile atoms must contain two code book atoms for the smooth and detail code books and a single code atom. The frame holds one or two tile atoms. FIG. 6 is a diagram of the overall structure of a compressed frame.

Frame Atoms

A frame atom starts with either a single byte Keyframe or Interframe atom type code followed by a 3-byte length for the frame in long words. The code for a keyframe is 0x00 (hex 00) while the code an interframe is 0x01. The next two 16-bit words hold the width and height of the frame in pixels, and the next word holds the count of the tiles in the frame.

Tile Atoms

A tile atom starts with an atom code of 0x10 for a Keytile (a tile of a keyframe) or 0x11 for an Intertile (a tile of an interframe). After the length are four 16-bit words for the rectangle bounding the tile in coordinates representing top, left, bottom, right in that order. Every frame must have at least one tile, and for images beyond 240×180, the coder preferably generates two tiles per frame.

Code Book Atoms

The code book atoms come in detail and smooth form and both are required in each tile. It is possible that no new code book entries will be needed in a tile in either one or both of the detail or smooth code books. In the case of a zero entry code book, the first word of the code book is still required holding the single byte code book atom type code and the 24-bit length. The length value will hold a value of 1 in this case to indicate that the code book atom had a length of only one long word.

A code book atom can hold either a full code book or a partial code book. A full code book atom is assumed to have contiguous code book entries starting at entry 0 of the code book. A partial code book atom holds code book entries that are to be added to an existing code book. It holds both code book entries and map bits that indicate which entries in the existing code book are to be replaced. Either full or partial code books may be used in keytiles or intertiles, so there is no link between the code book type and key or interframes. The code book atom type codes in the first byte of the atom are as follows:

| Code | Code Book Atom Type |
|---|---|
| 0x20 | Full Detail Code Book |
| 0x21 | Partial Detail Code Book |
| 0x22 | Full Smooth Code Book |
| 0x23 | Partial Smooth Code Book |

Within a full code book atom, the code book entries are only code book vectors. These consist of six-component vectors with four Y components and a U and a V component, with each component being an 8-bit value. A full code book can have any number of code book entries up to 256. The length value in the first long word of the atom will indicate the number of code book entries that are present. The first code book vector is loaded into address 0 of the code book, and the subsequent vectors are loaded into sequential locations in the code book. FIG. 7 is a diagram of a full code book atom.

Partial code book atoms contain new code book vectors that will be added to the existing code books. The data in the partial code book consists of 32-bit masks that indicate which code book entries are to be updated, and the new code book vectors. The first mask word controls the updating of the first 32 code book entries. The most significant bit of the mask corresponds to address 0 of the code book and the least significant bit to address 31. If a bit is set in the mask, a new code vector is present and will be loaded into the code book, while if a bit is not set, there is no new code vector for that address of the code book. This format is continued through the partial code book. There is no minimum requirement for the number of code book entries that must be contained in the partial code book. FIG. 8 is a diagram of a partial code book atom. Note that in the FIG. 8 example, a 16-bit pad word is required at the end of the atom to force the code book to be an integer number of long words in length.

Code Atoms

The code atoms hold the actual code words for the compressed Image data. There are three types of code atoms: keyframe code atoms; interframe code atoms; and all smooth code atoms. The keyframe code atom is used in a keytile while the interframe code atom is used in an intertile. The all smooth code atom is a special case that is used when all of the image data in a tile consists of encoded smooth blocks. In this case, there is no interframe coding so the all smooth code atom is used only in a keytile. The all smooth code atom eliminates the need for mask bits to indicate smooth or detail blocks and mask bits indicating if a block changes with this frame. This uses less data to encode the image data and is useful in cases when the compressed data rate must be constrained.

The keyframe code atom contains encoded data for the entire tile in which it is contained. The encoded data consists of a mixture of code words for smooth and detail blocks and mask bits that are used to distinguish them. The mask bits are held in 32-bit words that precede the encoded data that the mask bits describe. Since a smooth block is defined by a single image vector, it can be encoded with a single code word. Detail blocks require four image vectors and so require four code words. Smooth blocks are indicated by a "0" in the mask, while detail blocks are indicated by a "1". The overall format of the keyframe code atom is shown in FIG. 9. The keyframe atom code has a hex value of 0x30. FIG. 10 is an example of the smooth/detail mask coding and the code words that follow it.

The interframe code atom is similar to the keyframe code atom except that it holds only codes for blocks that are different from the same blocks in the last frame. In addition to indicating smooth or detail blocks, the mask words in the interframe code atom are used to support interframe differencing. If a block does not change from the last frame to the new current frame, the block can be "skipped" and no code word is provided for it. The mask word is coded to first indicate if a block is to be skipped or not, and if not, if it is a smooth or detail block. FIG. 11 represents the coding of the mask words in an interframe code block. The hex value of the interframe code atom is 0x31.

When a block is skipped, there is no code word for it in the interframe code atom. The CVC decoder must keep track of the current block position in the frame using the mask words and must only update those that are not skipped.

The all smooth codes code atom only contains code words for smooth blocks. There is no interframe differencing and all of the blocks are by definition smooth blocks. This eliminates the need for any mask words. The hex value of the all smooth codes atom is 0x32.

FIG. 12 is a summary of the code for each type of atom.

Decoding the Compressed Data Stream

It is an object of the invention to support real-time playback of high quality video on low cost microprocessor based systems. This is enabled by the high quality video compression achieved by the above-described type-based VQ compression, and the above-described compressed data stream definition that is very easy to interpret and decode.

Three methods for implementing the decode function for the CVC compression technique are described herein. All three methods can be supported on low cost microprocessor-based systems. The first decoding method is implemented completely in software. The second method makes use of the functions commonly supported by a conventional graphics processor, often found in microprocessor-based systems, to improve the performance of the decoding. The final decoding method adds special functions to the internals of a conventional graphics processor to implement in hardware the most important operations used in decoding the CVC data stream. This implementation further improves the decoding performance and allows real-time decoding even on systems with low performance microprocessors.

We first describe a software implementation of the decoding operation, which can be performed by a microprocessor-based system including a microprocessor (programmed with software for implementing the decoding method), memory, a storage device on which the compressed data is stored, and a frame buffer. An example of such a system (which preferably also include color conversion means for converting decompressed YUV video into RGB video pixels and storing the RGB pixels in the frame buffer) is discussed above with reference to FIG. 3A.

Figure 14:
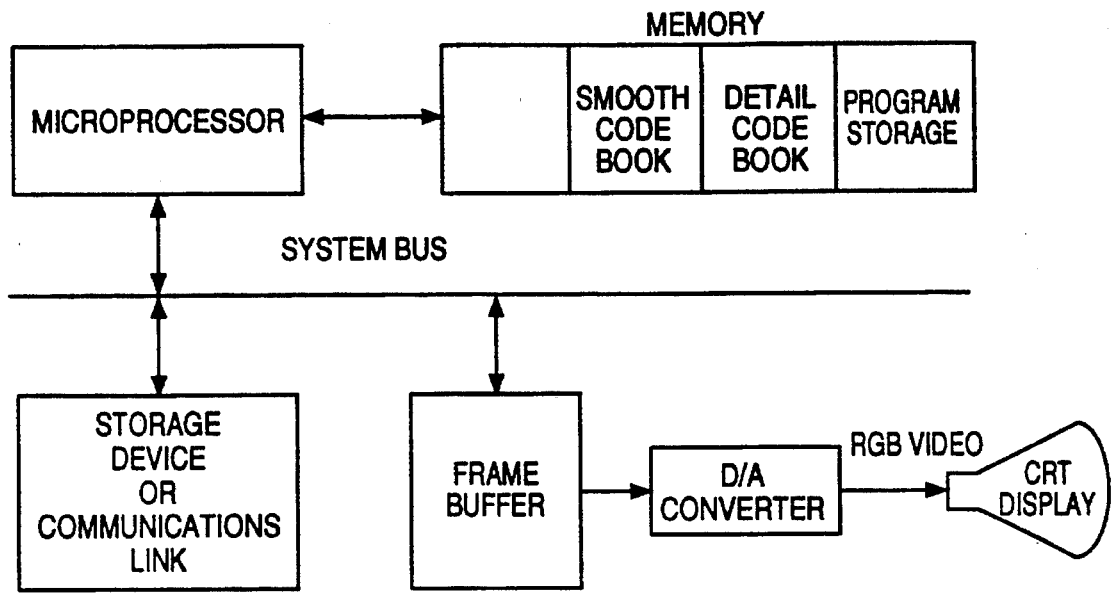
FIG. 14 is a block diagram of a system where the decoding is performed with software according to a preferred embodiment of the invention.

FIG. 14 shows an overall diagram of a system where the decoding is performed in software. The microprocessor reads the compressed data frames in sequence from the storage device and processes them. The code books (e.g., smooth and detail code books) are extracted from the compressed data stream and stored in the main memory of the microprocessor. The microprocessor maintains the program for decoding in its main memory along with the code books organized as look-up tables. The code books should be stored in the format and color space of the system's frame buffer. Accordingly, as the code book entries are received in the data stream, they are color converted and stored in the color space and data format of the frame buffer. If the frame buffer stores 24-bit RGB pixels, each code book entry should be converted to a pixel of that format. If the frame buffer stores 8-bit indexed color components, each code book entry should be converted to that format. In the case that the code book entries represent 2×2 or 4×4 pixel blocks, dithering techniques can be effectively applied to the code book entries as they are converted. This is of particular interest in the case of 8-bit index color. The detail code book entries should be stored in exactly the same way that a 2×2 block of pixels is stored in the frame buffer, and the smooth blocks should be stored in exactly the same way that a 4×4 block of pixels is stored in the frame buffer. The goal of all is to decode the image code words by a table look-up followed by a write of a 2×2 or 4×4 block of pixels (which are code vectors or color-converted code vectors) into the frame buffer, followed by an update of the frame buffer address. When skip bits are encountered in the compressed interframes, only the current frame buffer address is updated (no pixels are written into the frame buffer).

Figure 15:
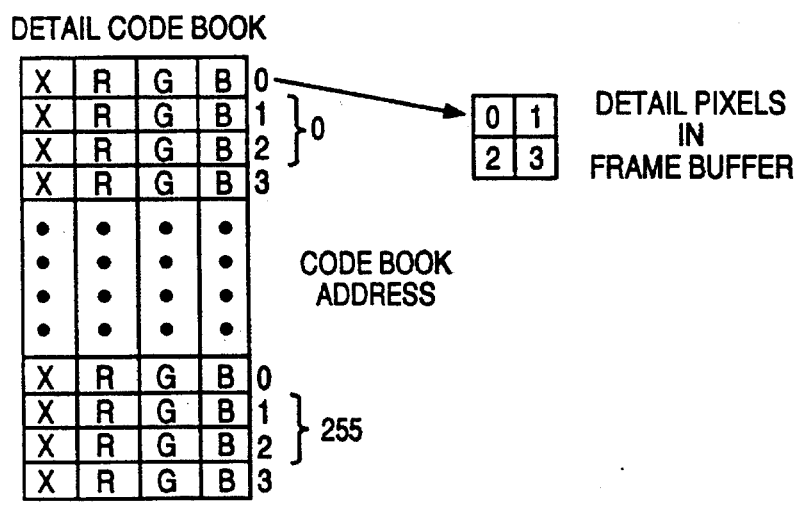
FIG. 15 is a diagram of the organization of the detail code books in memory in the case where the frame buffer is an RGB frame buffer according to a preferred embodiment of the invention.
Figure 16:
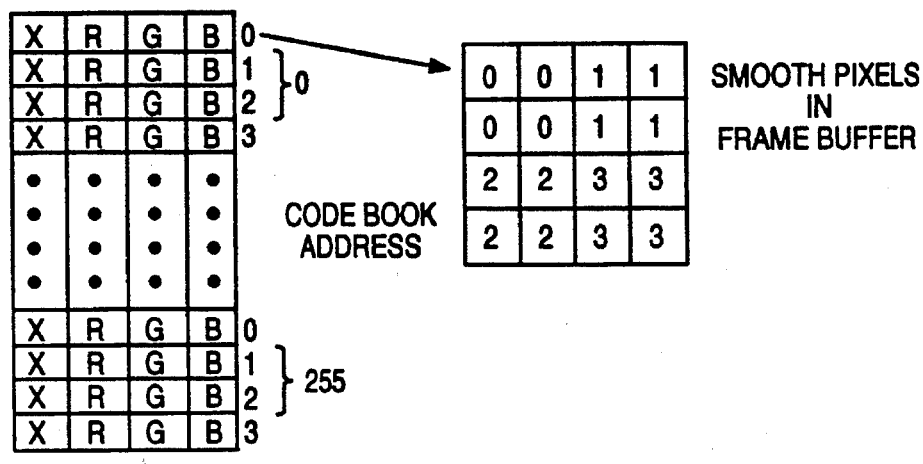
FIG. 16 is a diagram of the organization of the smooth code books in memory in the case where the frame buffer is an RGB frame buffer according to a preferred embodiment of the invention.

FIGS. 15 and 16 shows the organization of the detail and smooth code books in memory in the case where the frame buffer is an RGB frame buffer. The decoding program fetches data for the compressed data stream from the storage device or communications link. The code book entries are then converted from YUV to RGB and are stored in the appropriate locations of either of the detail or smooth code books stored in the microprocessors memory.

There are a number of well understood means for converting from YUV to RGB. In this example memory is organized as 32 bit words. Each code book entry occupies four memory locations as shown in the figures. The most significant byte of each word is not used and is shown as an "X". The lower three bytes hold the RGB color values. When image code words are decoded, the code word is multiplied by 16 and added to the address of the first word of the appropriate code book. This creates a byte address of the code book entry that matches the code word. The multiply by 16 is easily performed by shifting 8 bit code word value left by four bits. The pixels in the code book entry are then copied to current position in the frame buffer where the image is being decoded. As a result, the code words are decoded by a shift of four bits, an addition, followed by copying four or 16 pixels into the frame buffer. This operation is easily performed at high speed on commonly available microprocessor-based systems. The limiting factor is the speed with which pixels can be copied from the memory of the microprocessor, over the system bus and into the frame buffer.

The microprocessor reads the mask bits from the compressed data stream and uses them to determine whether the following code words are for smooth or detail blocks and (in an interframe) whether the current block is to be skipped. The code words are then used to form addresses to the code books stored in main memory, and the pixel in the code book entry corresponding to each code word is copied into the frame buffer. The compressed data stream is preferably ordered to cover the image from left to right and top to bottom. The microprocessor maintains a current frame buffer address that is updated after each decoded code word is copied from the code book to the frame buffer.

Each compressed keyframe will include full smooth and detail code books as well as compressed image data for the frame. In a keyframe, there is no interframe coding. The compressed image data consists only of smooth and detail code words and mask bits to indicate which are which.

Each compressed interframe is decoded presuming the existence of a previous frame and existing code books. The data in each compressed interframe consists of updates to the code books and the compressed interframe image data. The code book updates are a sequence of new code book entries and mask bits that indicate which of the code book addresses are to be updated with the new entries. With interframe decoding, only some of the blocks of pixels in the frame buffer will change (by being overwritten by code vectors (or color-converted code vectors) newly looked up from the code books. The coded image data consists of smooth and detail code words for blocks to be updated, and mask bits indicating smooth or detail type and whether a block is to be skipped. When a block will not change in the current frame, a "skip" bit in the data stream indicates that the current block is to be skipped. As mentioned, when the microprocessor encounters a skip bit in a compressed interframe, it responds only by updating the current frame buffer address (no pixels are written into the frame buffer, so that the content of the frame buffer at the current address remains unchanged).

Figure 17:
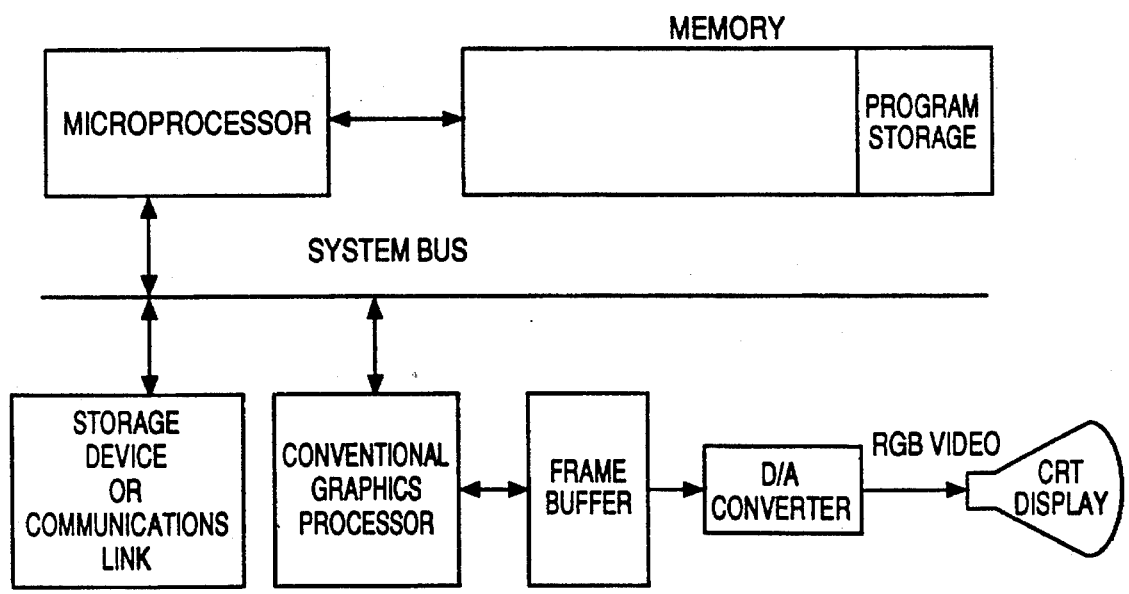
FIG. 17 is a block diagram of a microprocessor-based computer system that employs a graphics system that includes a graphics processor.

Many microprocessor-based computer systems now employ graphics systems including graphics processors, as illustrated by FIG. 17. In addition to providing control over the frame buffer, conventional graphics processors support simple graphics operations on the frame buffer.

Figure 18:
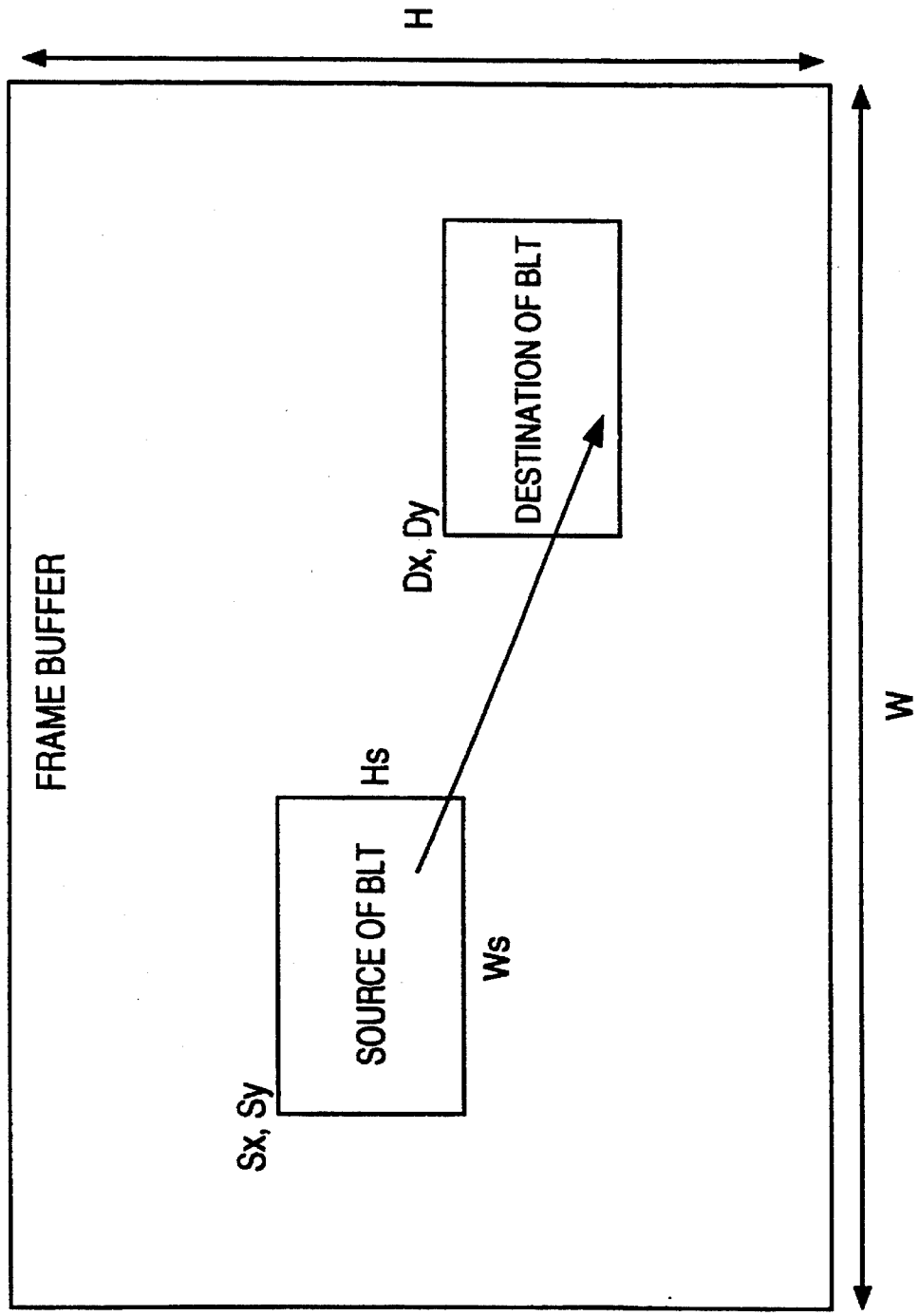
FIG. 18 is diagram illustrating one common class of graphics operations known as a pixel or bit Block Transfers (or "pixel BLTs").

One common class of graphics operations are called pixel or bit Block Transfers or pixel BLTs. These are rectangular copy operations of pixels from one location in the frame buffer to another. An example of a BLT is shown in FIG. 18. The BLT is defined by the X,Y coordinates of the upper left corners of the source and destination (Sx, Sy) and (Dx,Dy), the width and Height Ws,Hs of the source and the width W of the frame. It is a well understood problem in the field to create hardware to perform this function completely within a graphics processor using only these parameters to define the specific operation.

Figure 19:
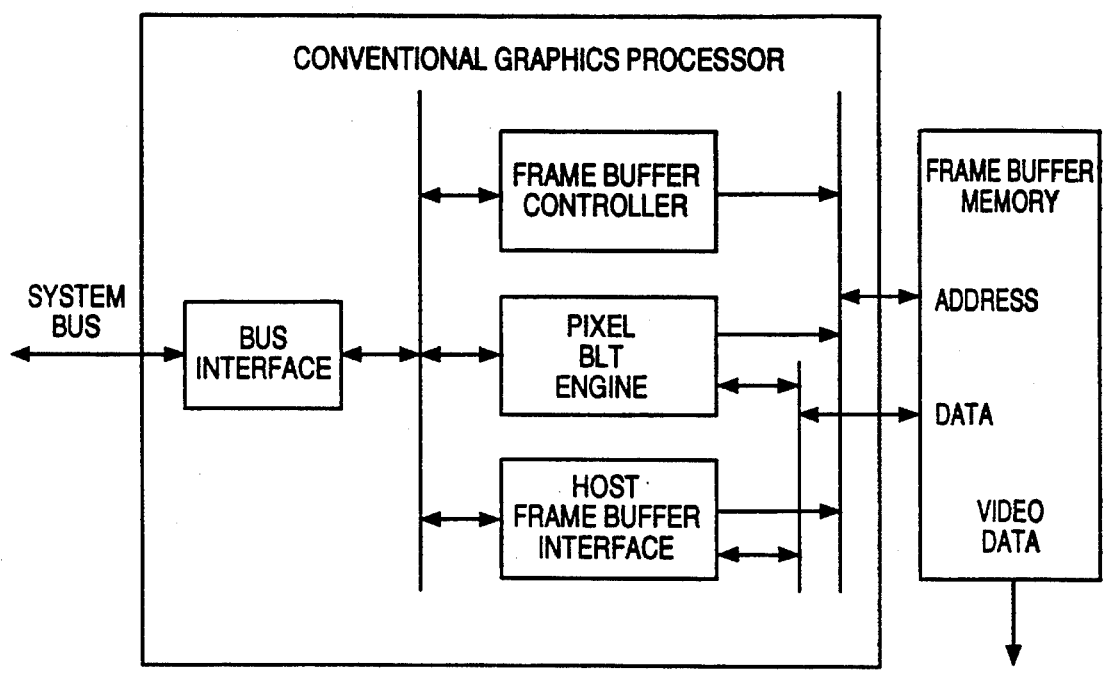
FIG. 19 is a block diagram illustrating the internals of a graphics processor.

The internals of the graphics processor are shown in FIG. 19. Such a processor is commonly implemented in a single chip. The microprocessor communicates with the graphics processor over the system bus by reading and writing data and commands to specific locations inside the graphics processor defined for the various operations that the graphics processor supports. The bus interface unit mediates these accesses to internal locations and routes the data associated with these accesses to the appropriate locations within the proper functional unit. The frame buffer controller generates all of the necessary external control signals and accesses to the frame buffer memory to generate the video image displayed on the CRT. In this example the frame buffer is constructed from VRAM with a dedicated video generation port. It is also common to use DRAM with only a single port. The host interface allows the host microprocessor to access the frame buffer memory to read and write individual pixels as if they were memory locations. The BLT engine embodies the hardware for performing the pixel BLT function.

Figure 13:
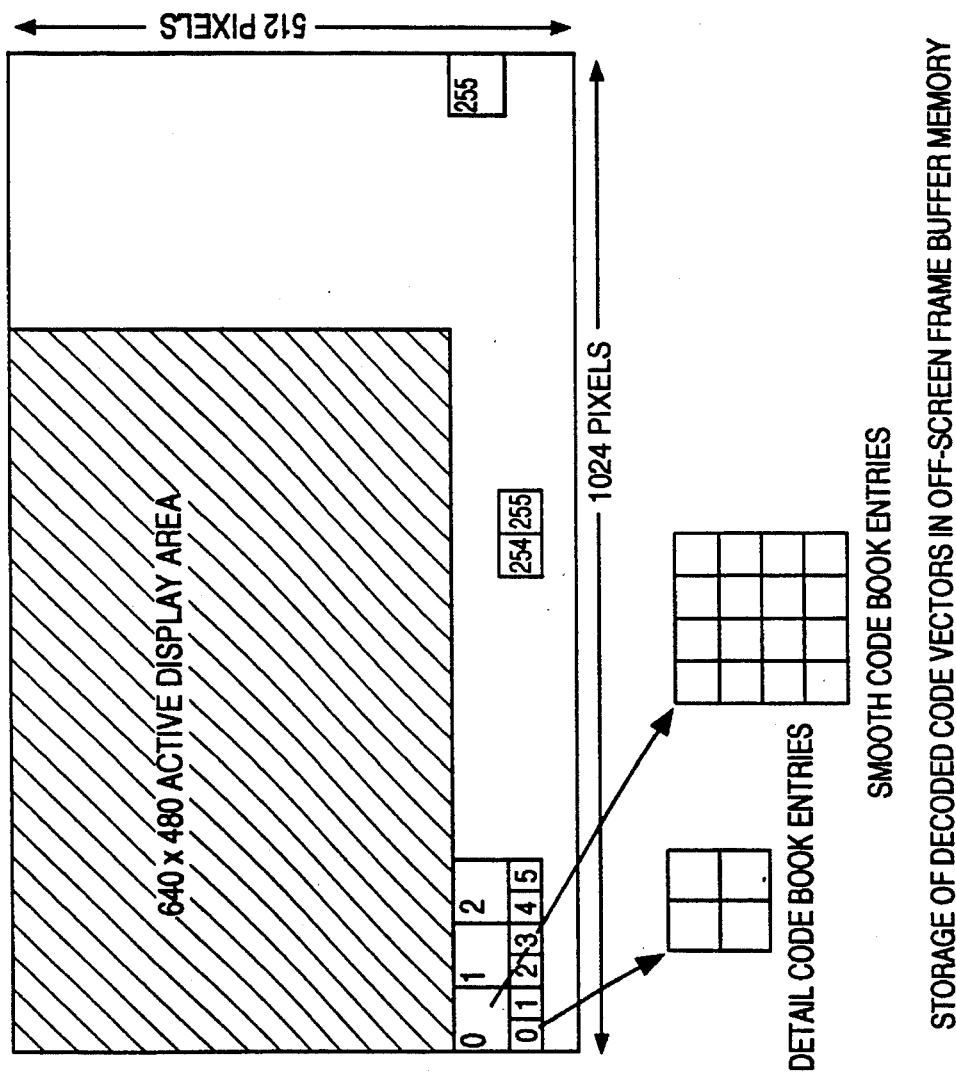
FIG. 13 is a diagram of the memory locations of a frame buffer employed in the decoding operation of a preferred embodiment of the invention.

It is common in many conventional graphics systems for the frame buffer to contain more pixels than are needed to display the image on the screen. This is the result of the fixed size of frame buffer memory chips and the commonly supported CRT resolutions. This often results in off-screen pixels being available for other uses. One very common situation is a frame buffer organized as 1024×512 pixels driving a CRT supporting a resolution of 640×480, as indicated in FIG. 13.

In performing decoding using such a system it is advantageous to store the decoded and color converted code books in the off-screen memory portion of the oversized frame buffer. The pixels for the smooth and detail code books are stored in off-screen memory in a way that the frame buffer address can be easily computed from the image code words. When the image code words are decoded they are converted by the microprocessor into pixel BLT commands that copy pixels from the correct code book entry in the off-screen memory to the current on-screen position (the "current" location in the active display area of the frame buffer). When code book updates are encountered, the code book entries are color converted and stored in the off-screen code book memory. This technique can produce a large performance gain in systems where the time to write pixels into the frame buffer from the microprocessor is not fast enough to keep up with real time video playback.

When implementing decoding using a processor with limited computing power or with low bandwidth from the processor to the frame buffer, it may be desirable to use graphics acceleration hardware to accelerate the playback. This has the added benefit of off-loading from the processor some of the decoding computing burden. Other reasons for using graphics hardware to assist in CVC decoding include hardware for scaling and filtering the decompressed data. For example, such hardware can be used to double the 320×240 size of a CVC compressed movie to full broadcast resolution of 640×480. This can be done by simply doubling the pixels horizontally and doubling the scan lines vertically. If no filtering is done, visible "jaggies" will be apparent. If a hardware filter is applied as part of the scaling, the quality is dramatically improved.

A variety of hardware assistance can be used to accelerate CVC decoding. It is possible to implement the decoding completely in hardware, but most of the benefits of hardware can be had with simple hardware assistance for decoding the image code words. An example of this will next be described.

A conventional graphics accelerator chip contains a number of standard functional units. These include a host interface, frame buffer controller, BLT engine, and a memory controller. The host interface is responsible for converting reads and writes from the host into accesses to internal control registers and to the frame buffer memory. The frame buffer controller is responsible for generating the video timing for the display and for performing a sequence of frame buffer accesses for generating the video. The BLT engine supports a set of operations for accelerating graphics functions. These include area fills and block transfers (BLTs) from one rectangular region to another. The memory controller is responsible for arbitrating all of the different accesses to the frame buffer memory and for generating the memory cycles.

The most important aspect of CVC decoding that can be assisted in hardware is the decoding of the image code words and the writing of the decoded pixels to the correct position in the frame buffer. To accomplish this, a conventional graphics accelerator is augmented with an additional functional unit called an image decoder that converts image code words into BLT commands. The host processor would be responsible for converting (in software) the code book entries into pixels and storing them in the off-screen memory portion of an oversized frame buffer. The host would write the image code words into the hardware image decoder, the hardware image decoder would convert them into BLT commands from the off-screen code book area of the frame buffer to the current on-screen position (in the active display area of the frame buffer).

Figure 20:
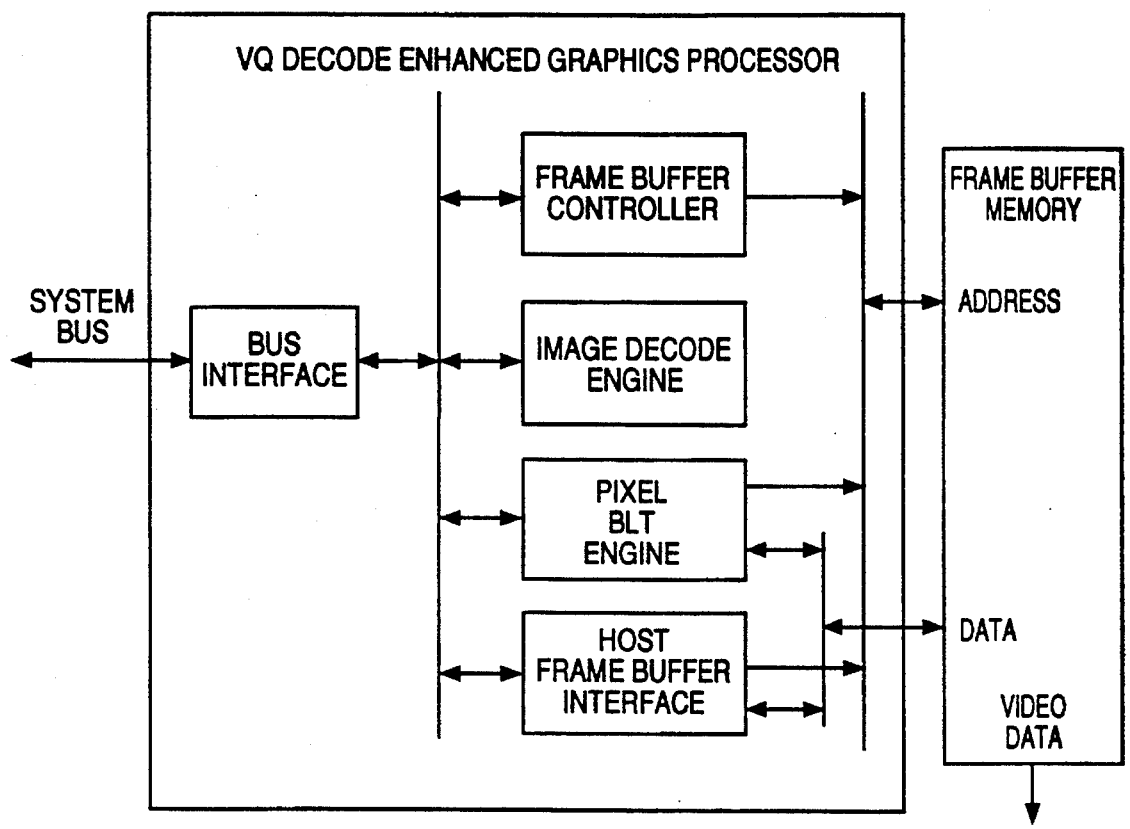
FIG. 20 is a block diagram illustrating a conventional graphics processor that has been enhanced with an image decode engine according to a preferred embodiment of the invention.
Figure 21:
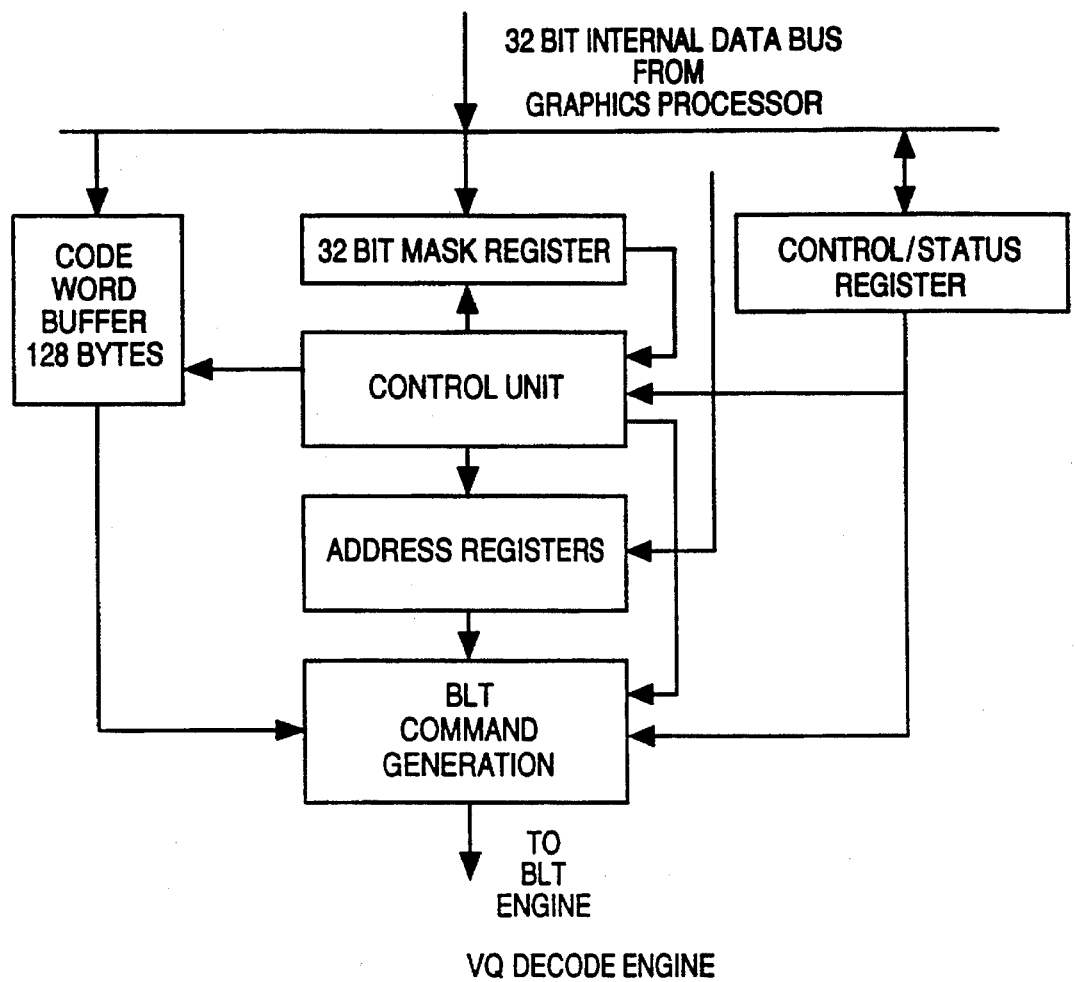
FIG. 21 is a block diagram illustrating the internal details of the image decode engine shown in FIG. 20.

FIGS. 20 and 21 illustrate an example of a system for decoding the image code words and writing the decoded pixels to the correct position in the frame buffer. FIG. 20 shows a conventional graphics processor that has been enhanced with an image decode engine, and FIG. 21 shows the internal details of such an engine. The image decode engine uses the mask bits and image code words to generate BLT commands in hardware that are directly fed to the BLT Engine to copy the appropriate off-screen code books entries to the current on-screen position. Prior to image decoding, the microprocessor loads several necessary frame buffer addresses into the address registers block inside the image decode engine. These are the X, Y frame buffer addresses of the upper left corner of the first code book entries of the smooth and detail code books in off-screen frame buffer memory, as shown in FIG. 13. The X,Y frame buffer address of the current position at which decoding is to start and the X coordinates of the Left and Right edges of the window on the screen into which video is being decoded. During image decoding, the microprocessor reads the mask words from the data stream and writes them into the mask register inside the image decode engine in the graphics processor. The microprocessor then reads the correct number of code words following the mask word from the data stream and writes them into the code word buffer in the image decode unit. The microprocessor then writes a command to start decoding into the control/status register. The decoding command also contains a bit to indicate whether the mask word is a key frame mask word or an interframe mask word containing skip bits.

When decoding starts the control unit begins testing the mask bits one at a time by shifting them to the right and sampling the least significant bit. The control unit keeps a count of how many mask bits have been sampled and stops decoding when the bits are exhausted. The control unit routes each image code word in sequence to the BLT command generation unit. With each code word that is decoded and converted, the control unit causes the X,Y current position to be updated in the address registers. When the X coordinate of the current position passes the right boundary of the window, it is reloaded with the X coordinate of the left edge of the window and the Y coordinate is incremented by four. The BLT command generation unit computes the address off the off screen X,Y address of the code book entry specified by the code word being decoded and this becomes the source X,Y address of the BLT. This is done by multiplying the code word by 2 for a detail code word or 4 for a smooth code word and add it to the X address of the upper left corner of the first corresponding code book entry. The multiplication is performed by a shift of 1 or 2 bits to the left. The Y address of the upper left corner of the first code book entry is used unmodified as the source Y address of the BLT command. The destination X,Y address of the BLT is the current position as held in the address registers. The width and height of the BLT are 2 for a detail code word and 4 for a smooth code word.

There are several special situations that must be handled. When a skip bit is encountered in an interframe mask word, the current position is updated in the address registers and no BLT command is issued. It is possible that the last bit of an interframe mask word will be a "Don't Skip" skip bit and the bit indicating smooth or detail will be in the next mask word. To know how many code words to fetch from the data stream and write to the code word buffer between each mask word, the host microprocessor must also interpret the mask bits. When it detects that this situation has occurred, it must flag this to the image decode unit when the next block of code words is decoded. This is done by setting a bit in the next command loaded into the control/status register indicating that the last mask bit was an interframe "Don't Skip" bit. So there must also be a "Don't Skip First Code" bit in the control/status register. When a smooth code word is decoded, the current position is advanced by four pixels to the right by adding four to the X coordinate of the current position, except when the right edge of the window is passed, when the X coordinate is set to the X address of the left edge of the window and the Y coordinate of the current position is advance by 4.

When a detail code word is decoded, the advancement of the current position is more complicated. Detail code words decode to a 2×2 block of pixels and the code words always occur in groups of four. The four 2×2 blocks comprise a 4×4 block. The first code word falls in the upper left of the 4×4 block, the next in the upper right, the next in the lower left and the last in the lower right. The current position X,Y addresses are advanced through these 4 2×2 blocks in this sequence until after the four detail codes are decoded, the current position is at the upper left of the next 4×4 block except when the current position has advanced beyond the right edge of the window. The host microprocessor also cannot initiate any new graphics processor operations until the last block of image code words has been decoded. The microprocessor tests a busy bit that is present in the control status register to determine when the decoding is done. The control unit keeps this bit set as long as decoding is active.

In the example shown in FIGS. 20 and 21, only the mask bit and code word decoding is accelerated in hardware. This is deemed to be the most efficient use of hardware since processing the code book entries is a small amount of the operations performed during image decoding. So in this example, the host microprocessor is responsible for decoding the code book entries and writing them into the off-screen memory. It is completely possible to add an additional functional unit for decoding the code book entries, converting them to RGB pixels and storing them in off-screen memory. We have also assumed in this example that the code books are stored exactly as shown in FIG. 13 where the code book entries are stored left to right with increasing code book address in off-screen memory in a single row. More complex code book storage organizations in off-screen memory are possible with only simple extensions to the formation of the source address of the BLT. Some organizations, such as row and column organization off-screen code books, will require some additional address registers to specify the row/column format organization for the process of address formation.

It is desirable to implement decoding in a manner providing a smooth playback frame rate at the highest possible number of frames per second. To accomplish this, the sequence of processing operations should be well managed and the total number of operations that must be performed with each compressed frame should be minimized.

Management of time and frame rate is critical for high quality decoding of stored compressed data ("playback"). Smooth, evenly spaced delivery of decoded frames will be noticeably better than the same number of frames played per second but with a wide variation in the time for each frame. On whatever platform that is being used for playback, some software framework is needed to solve this problem.

On a Macintosh computer, commercially available software known as "QuickTime" software can provide this framework, and on a computer operating under the conventional "Windows" operating system, the commercially available software known as "Video For Windows" software can provide the framework. It is not sufficient to playback frames as fast as they can be decoded, since that could be faster or slower than the frame rate at which the original content was captured to implement compression.

When the decoding system can decode frames faster than the frame time, the decoding operation is simply delayed to stay in synchronization with the captured frame rate. On slow platforms where the decoder cannot keep up with the frame rate, frames should be skipped periodically in order to keep the playback rate of the movie as close to real time as possible. Due to use of interframe coding in preferred embodiments of the invention, and given the nature of interframe coding, it is not possible to skip single compressed interframes. When a frame must be skipped, the decoder will have to skip to the next keyframe.

YUV to RGB Conversion

Since the code book entries in the compressed data stream are in YUV color format (in preferred embodiments), the decoding process should convert the decompressed pixels from YUV to RGB format (to display the corresponding decompressed image on an RGB color display device). The following transformation is a simple technique for converting a YUV color value into a 24 bit RGB color value: $R=V+Y$, $G=Y-V/2-U/4$, and $B=U+Y$. This transformation will save time only in color converting code book entries as they are received in the compressed data stream, and will produce a moderate speed improvement for decoding compressed keyframes where both code books are entirely replaced.

Preferred embodiments of the invention have been described which employ two code books to perform VQ compression of image data, where the image data consists of rectangular blocks classified into two types (depending on their level of detail, or spatial frequency content), with blocks of a particular type being compressed using the code book for that type (i.e., a "smooth" code book for smooth blocks, and a "detail" code book for detail blocks). Other embodiments of the invention employ N code books (where N is an integer greater than two) to perform VQ compression of image data, where the image data consists of rectangular blocks classified into N different types (depending on their level of detail or spatial frequency content), with each block of a particular type being compressed using one code book for that type (so that each code book is used only for compressing blocks of one particular type).

Various other modifications and alterations in the method and apparatus of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A vector quantization method for compressing image data, wherein the image data comprises frames and each of the frames comprises blocks of pixels, said method including the steps of:

(a) classifying the blocks into at least two types according to level of detail, said types including at least a first type and a second type, wherein the frames of the image data include a keyframe followed by an interframe, each of the blocks of the first type consists of four image vectors, and each of the image vectors comprises a number of YUV values;

(b) performing vector quantization encoding on blocks of the first type using a first dedicated code book, to generate first code words;

(c) performing vector quantization encoding on blocks of the second type using a second dedicated code book, to generate second code words;

generating a smooth frame for the keyframe, wherein the smooth frame is a reduced resolution version of the keyframe, wherein the smooth frame consists of smooth blocks, and wherein each of the smooth blocks comprises an image vector comprising said number of YUV values;

performing step (b) on each of the blocks in which variation among the pixels exceeds a selected threshold, to generate four first code words; and for each of the blocks in which variation among the pixels does not exceed the selected threshold, performing step (c) on a corresponding one of the smooth blocks to generate one of the second code words.

2. The method of claim 1, including the steps of:

generating a smooth frame for the interframe, wherein the smooth frame is a reduced resolution version of the interframe, wherein the smooth frame consists of smooth blocks, and wherein each of the smooth blocks comprises an image vector comprising said number of YUV values;

comparing the blocks of the interframe to corresponding blocks of the keyframe;

for each of the blocks of the interframe matching a corresponding block of the keyframe, setting a skip bit rather than performing vector quantization encoding thereon;

performing step (b) on each of the blocks of the interframe which does not match a corresponding block of the keyframe, and in which variation among the pixels exceeds a selected threshold, to generate four first code words; and for each of the blocks of the interframe which does not match a corresponding block of the keyframe, and in which variation among the pixels does not exceed the selected threshold, performing step (c) on a corresponding one of the smooth blocks to generate one of the second code words.

3. The method of claim 1, wherein said each of the image vectors consists of four Y values, a U value, and a V value.

* * * * *